(12) United States Patent
Xu et al.

(10) Patent No.: US 10,878,213 B2
(45) Date of Patent: Dec. 29, 2020

(54) TWO-DIMENSIONAL CODE AND METHOD, TERMINAL, AND APPARATUS FOR RECOGNIZING TWO-DIMENSIONAL CODE

(71) Applicant: Tencent Technology (Shenzhen) Company Limited, Guangdong (CN)

(72) Inventors: Dianping Xu, Guangdong (CN); Yugeng Lin, Guangdong (CN); Chen Ran, Guangdong (CN); Jingjing Li, Guangdong (CN); Hongyang Wang, Guangdong (CN); Leteng Weng, Guangdong (CN); Hao Chen, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 16/450,666

(22) Filed: Jun. 24, 2019

(65) Prior Publication Data
US 2019/0311169 A1 Oct. 10, 2019

Related U.S. Application Data

(63) Continuation of application No. PCT/CN2018/079124, filed on Mar. 15, 2018.

(30) Foreign Application Priority Data

Mar. 31, 2017 (CN) .............................. 201710208336

(51) Int. Cl.
*G06K 7/14* (2006.01)
*G06K 7/015* (2006.01)
*G06K 19/06* (2006.01)

(52) U.S. Cl.
CPC ........... *G06K 7/1421* (2013.01); *G06K 7/015* (2013.01); *G06K 7/1417* (2013.01); *G06K 7/1473* (2013.01); *G06K 19/06037* (2013.01)

(58) Field of Classification Search
CPC .......... G06K 7/1421; G06K 19/06037; G06K 7/1473; G06K 7/1417; G06K 7/015
See application file for complete search history.

(56) References Cited

U.S. PATENT DOCUMENTS

| | | | | |
|---|---|---|---|---|
| 6,032,861 A | * | 3/2000 | Lemelson | G06K 7/14 235/456 |
| 8,262,000 B2 | * | 9/2012 | Denniston, Jr. | G06K 7/1417 235/494 |

(Continued)

FOREIGN PATENT DOCUMENTS

| CN | 101908155 A | 8/2010 |
|---|---|---|
| CN | 104778440 B | 7/2015 |

(Continued)

OTHER PUBLICATIONS

International Search Report for corresponding International application No. PCT/CN2018/079124, dated Jun. 7, 2018.

(Continued)

*Primary Examiner* — Sonji N Johnson
(74) *Attorney, Agent, or Firm* — Brinks Gilson & Lione

(57) ABSTRACT

A method, an apparatus, and a terminal for recognizing a two-dimensional code are provided. The two-dimensional code includes an image region and an encoding region. The image region and the encoding region have no overlap. The method includes selecting, from pixels of the two-dimensional code, a pixel included in a code element in an encoding region. The method further includes determining a value of the code element in the encoding region according to the pixel included in the code element in the encoding region. The method further includes recognizing the two-dimensional code according to the value of the code element in the encoding region.

20 Claims, 9 Drawing Sheets

(56) References Cited

U.S. PATENT DOCUMENTS

| | | | |
|---|---|---|---|
| 9,665,816 B1* | 5/2017 | Varone | G06K 19/06131 |
| 2006/0174531 A1* | 8/2006 | Lizotte | F41A 21/12 |
| | | | 42/1.01 |
| 2011/0044561 A1* | 2/2011 | Braunecker | G01D 5/3473 |
| | | | 382/296 |
| 2014/0008442 A1 | 1/2014 | Yamaguchi | |
| 2016/0092760 A1 | 3/2016 | Tanaka et al. | |
| 2016/0275443 A1* | 9/2016 | Hosokane | G06K 19/0614 |
| 2016/0342873 A1 | 11/2016 | Feld et al. | |

FOREIGN PATENT DOCUMENTS

| | | |
|---|---|---|
| CN | 104915697 B | 9/2015 |
| CN | 104966115 B | 10/2015 |
| CN | 105718980 A | 6/2016 |
| CN | 106447001 A | 2/2017 |
| CN | 106951812 B | 7/2017 |
| CN | 207051946 U | 2/2018 |

OTHER PUBLICATIONS

Written Opinion for corresponding International application No. PCT/CN2018/079124, dated Jun. 7, 2018.
Office Action dated Feb. 24, 2018, for corresponding Chinese application No. 201710208336.0.
Office Action dated May 28, 2018, for corresponding Chinese application No. 201710208336.0.

* cited by examiner

TWO-DIMENSIONAL CODE AND METHOD, TERMINAL, AND APPARATUS FOR RECOGNIZING TWO-DIMENSIONAL CODE

PRIORITY

This application claims priority to Patent Cooperation Treaty International Application No. PCT/CN2018/079124, filed Mar. 15, 2018, entitled TWO-DIMENSIONAL CODE AND METHOD AND APPARATUS FOR RECOGNIZING TWO-DIMENSIONAL CODE, AND TERMINAL, which claims priority to Chinese Patent Application No. 201710208336.0, entitled "METHOD AND APPARATUS FOR RECOGNIZING TWO-DIMENSIONAL CODE, AND TERMINAL" filed with the Chinese Patent Office on Mar. 31, 2017, each of which being incorporated by reference in its entirety.

FIELD OF THE TECHNOLOGY

This application relates to the field of two-dimensional code identification, and more specifically, to a two-dimensional code and a method and an apparatus for recognizing a two-dimensional code and a terminal.

BACKGROUND

When existing two-dimensional codes are identified, a positioning operation may be performed on the two-dimensional code, and a normalization operation may be performed on the two-dimensional code. The normalization operation refers to mapping the two-dimensional code into a standard rectangular image, so that each code element of the two-dimensional code corresponds to one pixel in the rectangular image. During the process of recognizing the two-dimensional code, a value of a code element of the two-dimensional code can be determined when colors or shading for one or more pixels in the rectangular image can be identified.

Both the positioning operation and the normalization operation may involve conversion of the shape and position of the two-dimensional code. If the conversion operation is performed on the two-dimensional code multiple times, the probability of error in the process of recognizing the two-dimensional code increases.

SUMMARY

According to a first example and various other examples, a method for recognizing a two-dimensional code is provided. The method includes selecting, from pixels of the two-dimensional code, a pixel included in a code element in an encoding region, the two-dimensional code including an image region and the encoding region, and the image region and the encoding region having no overlap. The method also includes determining a value of the code element in the encoding region according to the pixel included in the code element in the encoding region. The method further includes recognizing the two-dimensional code according to the value of the code element in the encoding region.

According to a second example and various other examples, an apparatus for recognizing a two-dimensional code is provided. The apparatus includes: a processor and a memory. The memory stores a computer readable instructions for execution by the processor. When executed, the instructions cause selection of, from pixels of the two-dimensional code, a pixel included in a code element in an encoding region, the two-dimensional code including an image region and the encoding region, and the image region and the encoding region having no overlap. The instructions further cause determination of a value of the code element in the encoding region according to the pixel included in the code element in the encoding region. The instructions further cause recognition of the two-dimensional code according to the value of the code element in the encoding region.

According to a third example and various other examples, a terminal is provided. The terminal includes a processing device. The processing device is configured to: select, from pixels of a two-dimensional code, a pixel included in a code element in an encoding region, the two-dimensional code including an image region and the encoding region, and the image region and the encoding region having no overlap. The processing device is further configured to determine a value of the code element in the encoding region according to the pixel included in the code element in the encoding region. The processing device is further configured to recognize the two-dimensional code according to the value of the code element in the encoding region; and a display device, configured to display an identification result of the two-dimensional code.

According to a fourth example and various other examples, a method for recognizing a two-dimensional code is provided. The method includes selecting, from pixels of the two-dimensional code, a pixel included in a code element in an encoding region of the two-dimensional code. The method further includes determining a value of the code element in the encoding region according to the pixel included in the code element in the encoding region. The method further includes recognizing the two-dimensional code according to the value of the code element in the encoding region.

According to a fifth example and various other examples, an apparatus for recognizing a two-dimensional code is provided. The apparatus includes a processor and a memory. The memory stores a computer readable instructions. The computer readable instructions are executable by the processor. When executed, the instructions cause selection of, from pixels of the two-dimensional code, a pixel included in a code element in an encoding region of the two-dimensional code. The instructions further cause determination of a value of the code element in the encoding region according to the pixel included in the code element in the encoding region. The instructions further cause recognition of the two-dimensional code according to the value of the code element in the encoding region.

According to a sixth example and various other examples, a terminal is provided. The terminal includes a processing device. The processing devices is configured to select, from pixels of a two-dimensional code, a pixel included in a code element in an encoding region of the two-dimensional code. The processing device is further configured to determine a value of the code element in the encoding region according to the pixel included in the code element in the encoding region. The processing device is further configured to recognize the two-dimensional code according to the value of the code element in the encoding region. The terminal may further include a display device configured to display an identification result of the two-dimensional code.

According to a seventh example and various other examples, a computer readable storage medium is provided. The computer readable storage medium may store executable instructions. When executed on a computer or other processing device, the instructions may cause execution of a method according to any of the foregoing examples.

According to an eighth example and various other examples, a computer program product including instructions is provided. When executed, the instructions may cause the execution of the method according to any of the foregoing examples.

According to a ninth example and various other examples, a two-dimensional code is provided. The two-dimensional code includes an image region provided therein with a first image and an encoding region not overlapped with the image region. The image region also includes a remaining region of the two-dimensional code other than the image region including at least two strip-shaped regions formed by aggregation of code elements of the two-dimensional code. The image region is located in the middle of the at least two strip-shaped regions. The at least two strip-shaped regions are radially distributed around the image region.

With reference to the ninth example and various other examples, in some implementations of the ninth example and various other examples, the at least two strip-shaped regions are evenly distributed around the image region.

With reference to the ninth example and various other examples, in some implementations of the ninth example and various other examples, the at least two strip-shaped regions include a strip-shaped region with a first length and a strip-shaped region with a second length that are distributed in a staggered scheme. The first length is greater than the second length.

With reference to the ninth example and various other examples, in some implementations of the ninth example and various other examples, the image region is a circular region or a rectangular region.

With reference to the ninth example and various other examples, in some implementations of the ninth example and various other examples, a target image for recognizing a service type corresponding to the two-dimensional code is further disposed in the remaining region of the two-dimensional code other than the image region.

With reference to the ninth example and various other examples, in some implementations of the ninth example and various other examples, a region in which the target image is located includes a target vertex for correcting the two-dimensional code.

With reference to the ninth example and various other examples, in some implementations of the ninth example and various other examples, a profile of the target image has a circular profile. The target vertex is a center point of the circular profile.

With reference to the ninth example and various other examples, in some implementations of the ninth example and various other examples, the two-dimensional code includes an edge region. The code elements in the edge region form a circular visual pattern.

With reference to the ninth example and various other examples, in some implementations of the ninth example and various other examples, the first image is a profile picture or a logo of a user of the two-dimensional code.

According to a tenth example and various other examples, a two-dimensional code is provided. The two-dimensional code includes at least two strip-shaped regions which are radially distributed. Each strip-shaped region is formed by aggregation of code elements of the two-dimensional code.

With reference to the tenth example and various other examples, in some implementations of the tenth example and various other examples, angles between adjacent regions in the at least two strip-shaped regions are equal.

With reference to the tenth example and various other examples, in some implementations of the tenth example and various other examples, the at least two strip-shaped regions include a strip-shaped region with a first length and a strip-shaped region with a second length that are distributed in a staggered scheme The first length is greater than the second length.

With reference to the tenth example and various other examples, in some implementations of the tenth example and various other examples, a target image for recognizing a service type corresponding to the two-dimensional code is further disposed on the two-dimensional code.

With reference to the tenth example and various other examples, in some implementations of the tenth example and various other examples, a region in which the target image is located includes a target vertex for correcting the two-dimensional code.

With reference to the tenth example and various other examples, in some implementations of the tenth example and various other examples. The target image has a circular profile. The target vertex is a center point of the circular profile.

With reference to the tenth example and various other examples, in some implementations of the tenth example and various other examples, the two-dimensional code includes an edge region. The code elements in the edge region form a circular visual pattern.

According to an eleventh example and various other examples, a printed matter is provided. The printed matter being printed with the two-dimensional code described in the foregoing examples.

In some of the foregoing implementations, codewords of the encoding region may include data codewords and error correction codewords.

In some of the foregoing implementations, the encoding region may include a format region. The code elements in the format region may be used for recording format information for the two-dimensional code, The format information may include at least one of the following: version information, an error correction level, and mask information. Further, in some of the foregoing implementations, code elements in the format region may be distributed around the image region.

In some of the foregoing implementations, the two-dimensional code may include a finder pattern. The finder pattern may have a circular profile.

DETAILED DESCRIPTION

Figure 1:
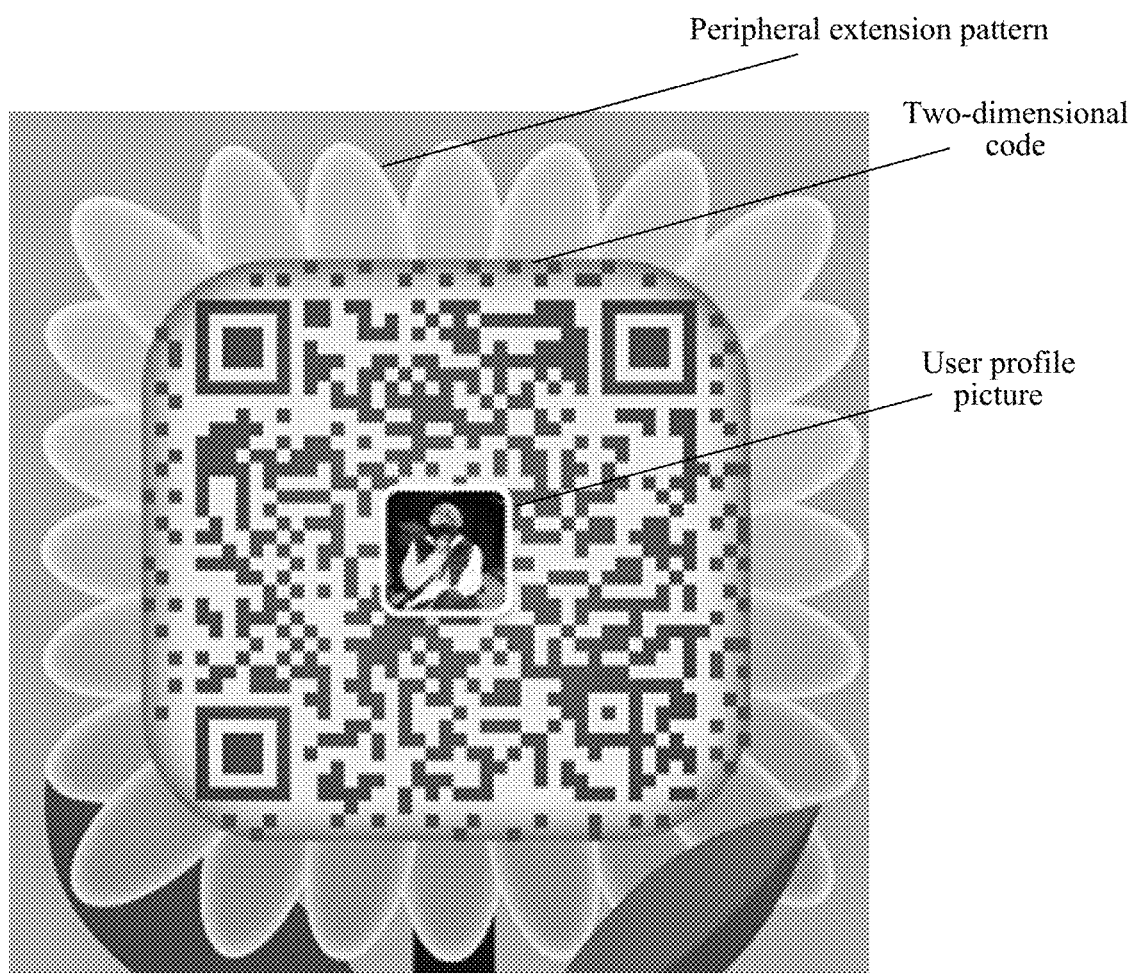
FIG. 1 is an example diagram of an existing two-dimensional code.

Users may insert images into the two-dimensional codes. The image, for example, may be a profile picture of LOGO self-defined by the user. As shown in FIG. 1, in an existing two-dimensional code technology, a profile picture of a user is inserted into a middle region of a two-dimensional code, and some extension patters are added to the periphery of the two two-dimensional code.

If an image is inserted into a two-dimensional code, some of code elements of the two-dimensional code are blocked. In a process of recognizing the two-dimensional code, error correction may be performed on the blocked part by using an error correction function of the two-dimensional code, and the efficiency of recognizing the two-dimensional code is reduced. An existing two-dimensional code (for example, a quick response (QR) code) is first discussed. An existing two-dimensional code is usually disposed in a two-dimensional rectangular region, and is formed by splicing a plurality of small basic units. The small basic units are referred to as code elements of the two-dimensional code. Code elements are basic units for forming a two-dimensional code. The two-dimensional code is usually formed by splicing (or aggregating) code elements.

In various implementations introduced herein, a code element may be square and may be differentiated using black and white coloration. Other implementations are possible. For example, a shape of a code element may be a square, a circle, a rounded square, or a combination of the foregoing shapes. A color of a code element may be, for example, a combination of black and white. Black indicates binary 1, and white indicates binary 0. Alternatively, the color of a code element may be a combination of red and white. Red indicates binary 1, and white indicates binary 0. Certainly, the two-dimensional code may also use a combination of other colors, provided that the color combination can be identified and distinguished by a machine.

Figure 2:
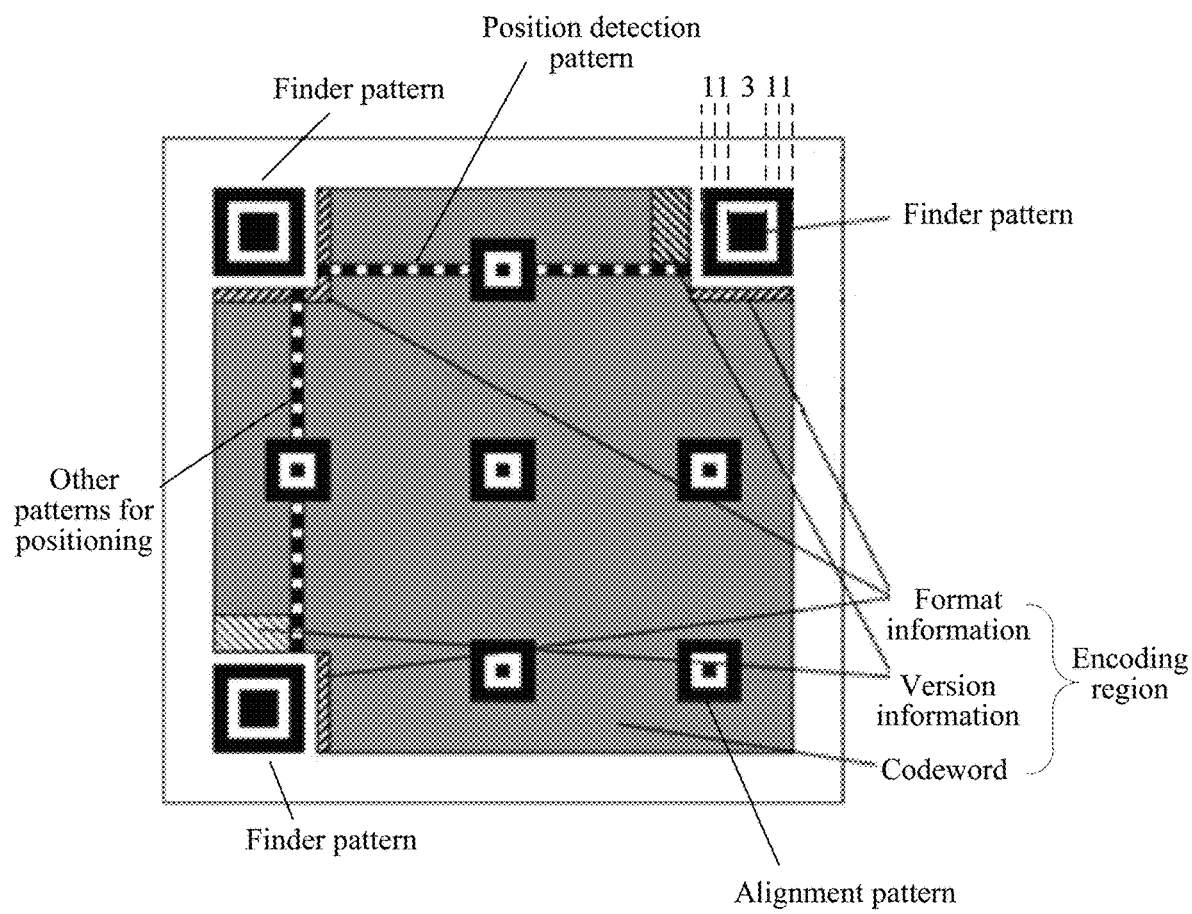
FIG. 2 is a schematic diagram of an internal structure of an existing two-dimensional code.

Referring to FIG. 2, an existing two-dimensional code includes a finder pattern (or referred to as a position detection pattern). The finder pattern may be used to determine a direction of the two-dimensional code. An existing two-dimensional code usually includes three orientation patters, which are respectively distributed on the upper left corner, the upper right corner, and the lower left corner of the two-dimensional code. The finder pattern is usually a pattern having fixed proportions (as shown in FIG. 2, the finder pattern is a black and white paper clip shaped pattern, and proportions of black and white code elements are 1:1:3:1:1). In a process of scanning a two-dimensional code, a finder pattern of the two-dimensional code is usually first searched based on the fixed proportions, so as to determine an orientation of the two-dimensional code.

Further, the two-dimensional code may further include one or more alignment patterns, which may also be referred to as auxiliary finder patterns. It should be noted that not all two-dimensional codes of all versions need to be provided with alignment patterns. The alignment pattern may be used for determining whether the two-dimensional code is folded and curved, and correcting the two-dimensional code when the two-dimensional code is folded or curved. Further, existing two-dimensional codes include an encoding region, and the encoding region is mainly used for storing format information and codewords of the two-dimensional code. The format information may include at least one of format information and version information shown in FIG. 2. The type of the format information mainly depends on the version of the two-dimensional code. Two-dimensional codes of different versions may be provided with different types of format information. For example, the format information includes format information and version information, which are usually stored in the rectangular region shown in FIG. 2. The version information of the two-dimensional code may be used to indicate the size of the two-dimensional code (or the quantity of code elements of the two-dimensional code). The format information of the two-dimensional code may be used for storing formatting data, such as error correction level and mask information of the two-dimensional code. Error correction level of the two-dimensional code usually includes L, M, Q, and H. The reason why an image can be inserted into a rectangular region of an existing two-dimensional code is that an error correction function of the two-dimensional code is used. Table 1 provides proportions of incorrect codewords that two-dimensional codes of different error correction levels can correct.

TABLE 1

| | |
|---|---|
| L | Capable of correcting 7% incorrect codewords |
| M | Capable of correcting 15% incorrect codewords |
| Q | Capable of correcting 25% incorrect codewords |
| H | Capable of correcting 30% incorrect codewords |

Continuing to refer to FIG. 2, code elements in the shaded region in FIG. 2 are used for recording or storing codewords. Codewords are bit sequences obtained after data encoding is performed on original data, and may include data codes and may also include error correction codes. Encoding schemes for the two-dimensional code include numerical encoding, character encoding, and the like. The error correction codes are usually calculated by algorithms such as a Reed-Solomon error correction algorithm based on a selected error correction level.

Figure 3:
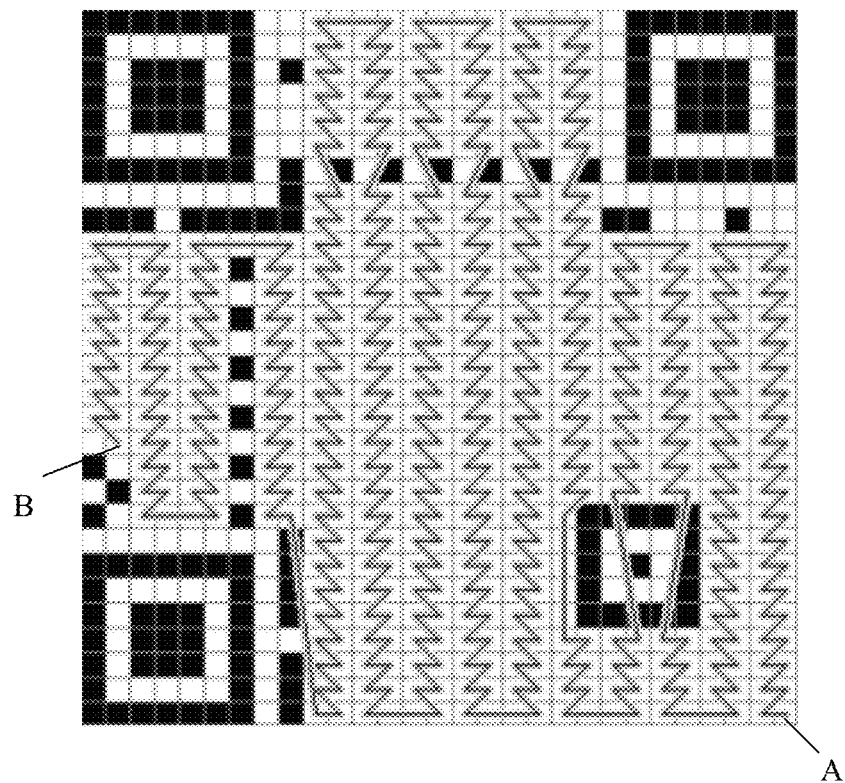
FIG. 3 is a schematic diagram of a filling path of an encoding region of an existing two-dimensional code.

After the version information, format information, and codewords of the two-dimensional code are determined, colors may be filled into code elements in the encoding region. FIG. 3 describes an example of a filling path of code elements for recording codewords in the encoding region. Referring to FIG. 3, after codewords are obtained, a point A in FIG. 3 may be used as a start point, and a point B shown in FIG. 3 may be used as an endpoint. Colors are filled into code elements in the encoding region along a filling path shown by the folding line in FIG. 3. If code elements in non-encoding regions such as an alignment pattern are encountered, the code elements may be bypassed or skipped. It should be understood that the filling path shown in FIG. 3 is merely an example. In fact, a filling path of any form may be set, provided that the filling path is pre-negotiated by an encoding end and a decoding end. Further, masking may be further performed on a filled pattern of the two-dimensional code by using a preset mask pattern, so that color distribution of a pattern of a finally presented two-dimensional code is uniform.

An image (such as a profile picture or a logo of a user) may be inserted into the encoding regions of existing two-dimensional codes. The image blocks some of code elements in the encoding region. Therefore, blocked code elements need to be corrected by using an error correction function of the two-dimensional code.

First, insertion of an image into the encoding region destroys integrity of the two-dimensional code. Further, the larger the quantity of blocked code elements in the encoding region the longer needed error correction time during identification of the two-dimensional code. This may lead to a reduced efficiency of recognizing the two-dimensional code. However, using error correction to incorporate (or partially incorporate) an image into an encoding region may be desirable in some cases to allow flexibility in image positioning. In addition, two-dimensional codes of various error correction levels have corresponding error correction limits. When the quantity of code elements covered by the image is excessively large and exceeds the error correction limit of the two-dimensional code, the two-dimensional code cannot be identified.

Figure 4:
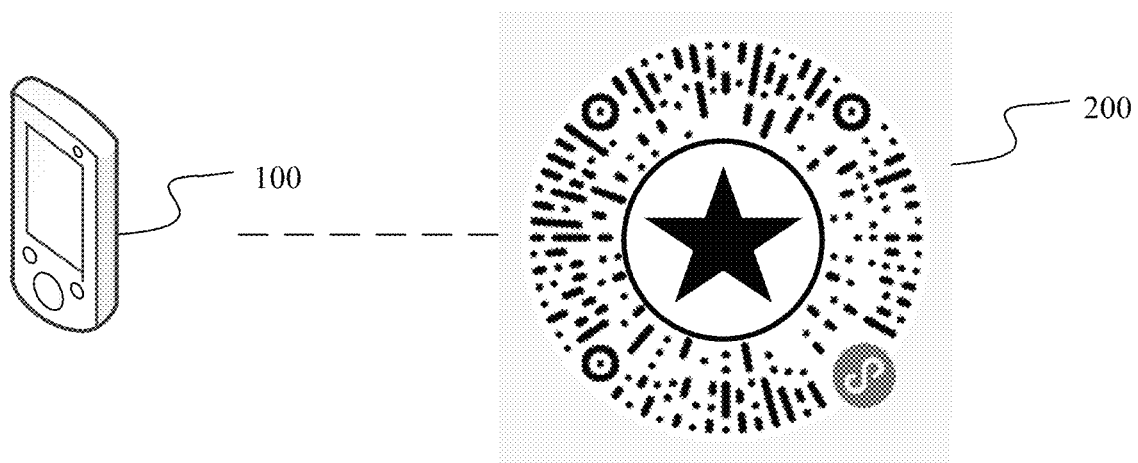
FIG. 4 is a schematic diagram of an example implementation environment of this application.

FIG. 4 is a schematic diagram of an example implementation environment. As shown in FIG. 4, a two-dimensional code 200 may be printed. A terminal 100 obtains corresponding information such as payment information by scanning the two-dimensional code 200 using a camera of the terminal 100. The two-dimensional code 200 may also be located on a display interface of another terminal. The terminal 100 photographs or scans the display interface of another terminal by using the camera, to obtain the two-dimensional code.

Optionally, in some embodiments, if the to-be-identified two-dimensional code 200 is located on a display interface of the terminal 100, the terminal 100 may obtain the two-dimensional code by means of screenshot, downloading, and the like. For example, when a picture of the two-dimensional code appears on a webpage currently accessed by the terminal, the two-dimensional code may be obtained by means of picture downloading. For another example, if the two-dimensional code appears in an article currently read by the terminal, or appears in a chatting session established by the terminal and another terminal, the two-dimensional code may be obtained by means of screenshot (e.g., or other framebuffer capture).

Figure 5:
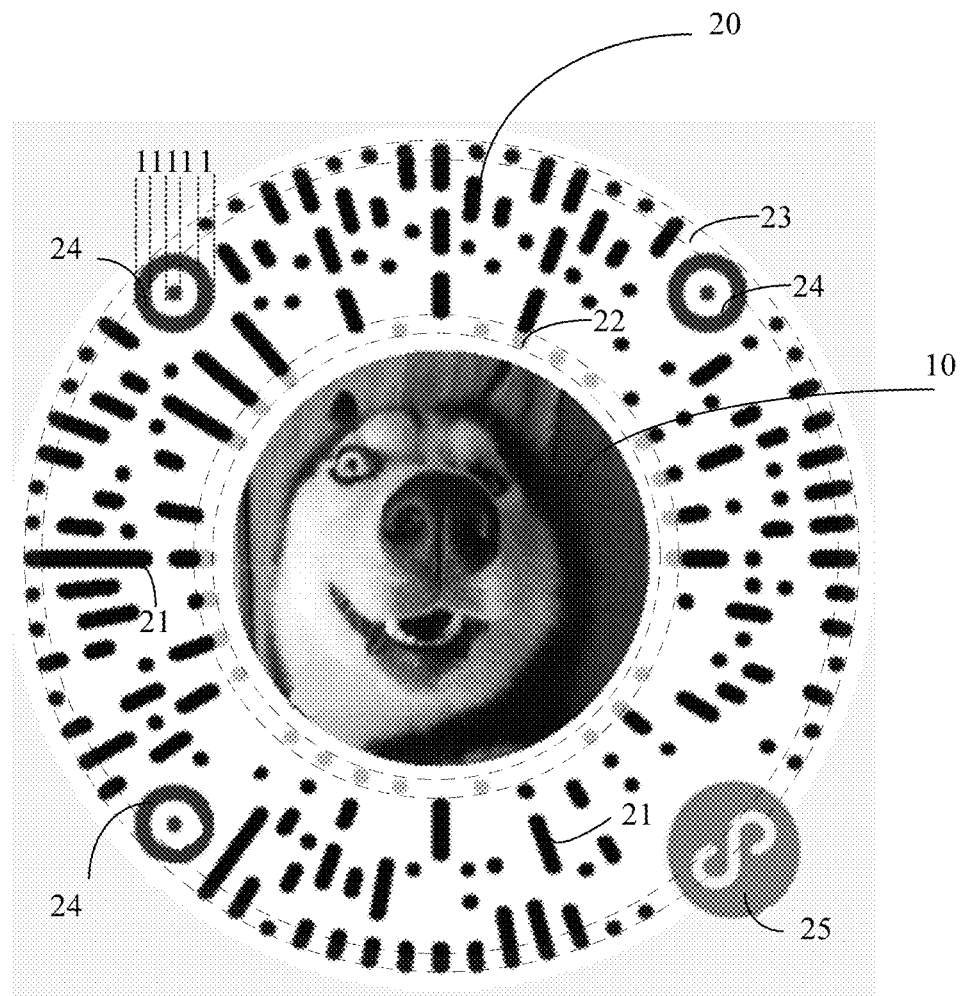
FIG. 5 is an example diagram of an example two-dimensional code according to one or more implementations.

The following describes the example two-dimensional code in detail with reference to FIG. 5.

As shown in FIG. 5, the example two-dimensional code includes an image region 10. A first image is disposed in the image region 10. A user may use various types of images according to actual requirements. Optionally, in some embodiments, the first image may be a profile picture or a logo of a user of the two-dimensional code.

Further, the two-dimensional code includes an encoding region 20. The encoding region 20 includes code elements for recording or storing codewords. The codewords include data codes. In some embodiments, the codewords may further include error correction codes. Moreover, the encoding region 20 and the image region 10 have no overlap. In other words, the encoding region 20 and the image region 10 are separated from each other. That the encoding region 20 and the image region 10 have no overlap means that the image region 10 is an independent region different from the encoding region 20. The image region 10 may be used for exclusively placing an image in some cases. In other words, an image placed in the image region 10 does not necessarily block any code element in the encoding region of the two-dimensional code.

The two-dimensional code includes an image region and an encoding region that have no overlap or incomplete overlap. Therefore, an image (namely, the first image) inserted into the image region (or at least a portion thereof) does not block a code element of the two-dimensional code. Compared with an existing solution of inserting an image into the two-dimensional code, this and other implementations can reduce the quantity of codewords that need to be corrected, thereby improving the efficiency of recognizing a two-dimensional code. Further, the two-dimensional code does not destroy a pattern formed by code elements in the two-dimensional code, to maintain the integrity of the two-dimensional code.

As shown in FIG. 5, in some embodiments, the encoding region 20 may be disposed around the image region 10. In some embodiments, the encoding region 20 may be disposed in parallel with the image region 10. For example, the entire two-dimensional code occupies a rectangular region, the image region 10 occupies an upper half part of the rectangular region, and the encoding region 20 occupies a lower half part of the rectangular region. In fact, positions of the image region 10 and the encoding region 20 may also be set in virtually any other manner, provided that they are both located in the entire two-dimensional code region.

Optionally, in some embodiments, the image region 10 may be a circular region. Optionally, in some embodiments, the image region 10 may also be a rectangular region.

As shown in FIG. 5, in some embodiments, the image region 10 is a circular region, and the first image is a circular image. In some other embodiments, the image region 10 may be a circular region, and the first image may be a rectangular or square image located in the image region 10.

Figure 6A:
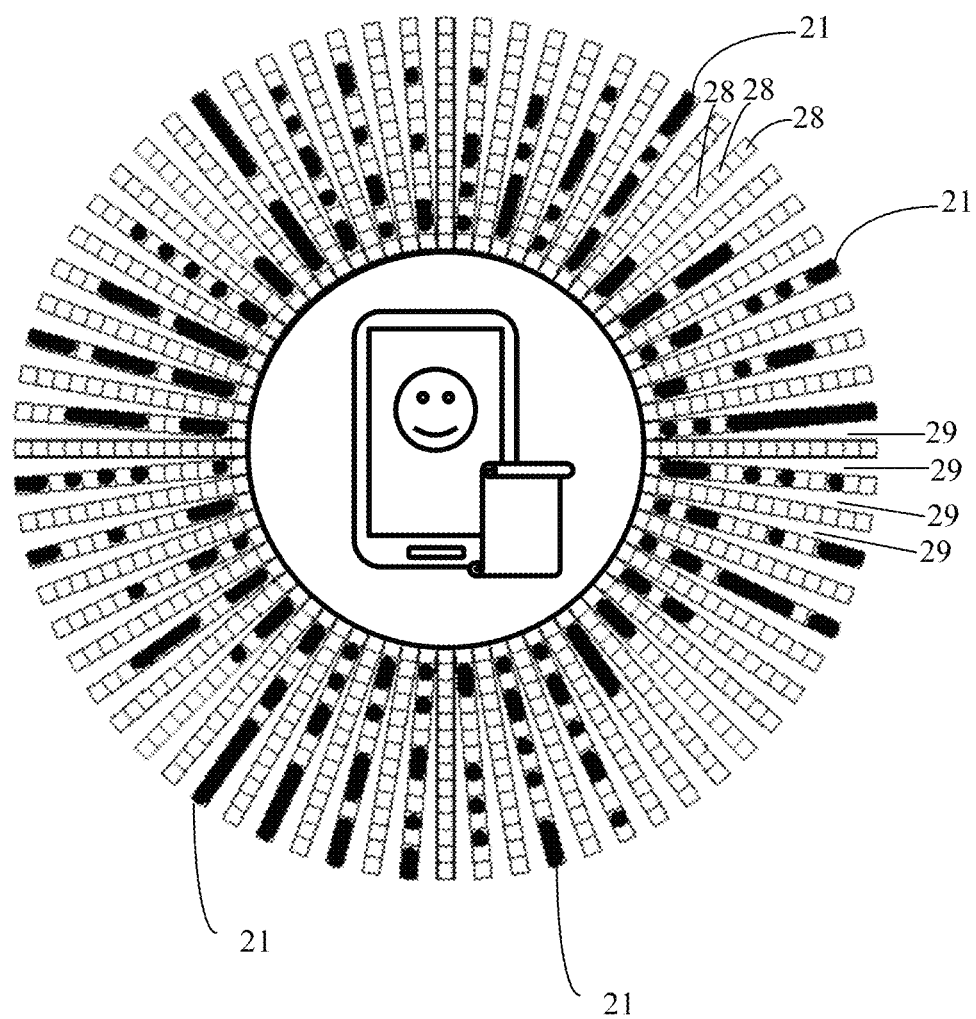
FIG. 6A is an example diagram of an example distribution form of code elements of a two-dimensional code according to one or more implementations.

Referring to FIG. 5 to FIG. 6A, a remaining region of the two-dimensional code other than the image region 10 may include at least two strip-shaped regions 21 (e.g., bars, line segments, joined pixels, rows of pixels, or other forms/configurations with extended aspect ratio) formed by aggregation of code elements of the two-dimensional code, the image region 10 being located in the middle of the at least two strip-shaped regions 21. The at least two strip-shaped regions 21 may be radially distributed around the image region 10.

Code elements of the two-dimensional code may be aggregated to form a plurality of strip-shaped regions. The plurality of strip-shaped regions may be distributed radially. As a result, a blank region is reserved between the strip-shaped regions. A user may dispose other patterns or text in the blank region according to actual requirements, to increase the amount of information that the two-dimensional code can provide to the user. In addition, the two-dimensional code distributed radially for aesthetic reasons.

In the foregoing embodiment, the at least two strip-shaped regions 21 are radially distributed around the image region 10. It should be noted that the two-dimensional code may not necessarily include the image region 10. For example, the at least two strip-shaped regions 21 may be radially distributed around a particular point or blank region in the two-dimensional code.

It should be noted that the strip-shaped regions 21 in this embodiment of this application are not necessarily rectangular strip-shaped regions, provided that the regions 21 are approximately strip-shaped. For example, the strip-shaped regions 21 may be regular rectangular regions, may be blade-shaped elongated regions, or may be elongated regions of any other shape.

Referring to FIG. 6A, each strip-shaped region 21 may include one or more code elements 28 (namely, small grids in FIG. 6A).

It should be understood that in FIG. 6A, a square code element is used as an example for description. Other shapes may be used. For example, the code element may be a circular code element. The quantity of code elements included in each strip-shaped region in FIG. 6A is merely an example for description. In addition, the quantities of code elements included in different strip-shaped regions 21 may be the same, or may be different.

As can be seen from FIG. 6A, a blank region 29 is disposed between different strip-shaped regions 21. The blank region 29 does not necessarily include a code element, and does not necessarily participate in a process of recognizing the two-dimensional code. It should be noted that the blank region merely refers to that the part of region does not include a code element, and does not necessarily indicate that the region is white. In fact, the region may be white, or may be set to any other color, and even other patterns or text may be added to the region, to increase the amount of information that the two-dimensional code can provide.

As shown in FIG. 3, an existing two-dimensional code is located in a rectangular region. The rectangular region includes m×n code elements (existing code elements are arranged into a form of a matrix). Values of m and n are related to a version of the two-dimensional code. For example, in a two-dimensional code of a version 1, m=n=21. Before the existing two-dimensional code is identified, not only a positioning operation needs to be performed on the two-dimensional code, but also a normalization operation needs to be performed on the two-dimensional code. The normalization operation refers to mapping the two-dimensional code into a standard rectangular image, so that each code element of the two-dimensional code corresponds to one pixel in the rectangular image. In a process of recognizing the two-dimensional code, a value of a code element of the two-dimensional code can be determined provided that a color of one pixel in the rectangular image is identified.

Unlike from existing two-dimensional codes, the two-dimensional code may include an image region and an encoding region that have no overlap, and code elements in the encoding region may be distributed into any shape or pattern. For example, the two-dimensional code may be distributed into the radiated pattern shown in FIG. 6A. For another example, the two-dimensional code may be distributed into one or more circular patterns around the image region. To recognize the two-dimensional code, the two-dimensional code may be first positioned and corrected. Then a pixel included in each code element in the encoding region is determined from pixels of the corrected two-dimensional code.

Optionally, in an implementation, the encoding region may be divided according to pre-recorded position information. To obtain a region occupied by each code element in the encoding region, the position information may be used to indicate a position of each code element in the encoding region. Pixels falling within the region occupied by each code element are selected from the pixels of the two-dimensional code as pixels included in each code element.

Using FIG. 6A as an example, in a process of recognizing the two-dimensional code. The encoding region of the two-dimensional code may be divided into grids similar to those shown in FIG. 6A. In some cases, each small grid may corresponding to a region including one code element. Then pixels falling within a region occupied by each code elements are used as pixels included in the code element.

Optionally, in various implementations, a pixel included in each code element may be determined by querying a pre-established mapping relationship according to an identifier of each code element in the encoding region. The mapping relationship may be a mapping relationship between the identifier of each code element and the pixel included in each code element in the two-dimensional code.

In this implementation, the region of the two-dimensional code does not need to be divided, and only a mapping relationship between positions of each code element and a pixel needs to be pre-recorded. For example, assuming that the two-dimensional code includes a code element n, and an region occupied by the code element n includes three pixels of the two-dimensional code, a mapping relationship between positions of the code element n and the three pixels (for example, row and column coordinates of the pixels in the image of the two-dimensional code) may be pre-recorded. In a process of recognizing the two-dimensional code, three pixels corresponding to the code element n may be searched directly based on the pre-recorded mapping relationship, and the two-dimensional code is identified based on colors of the three pixels.

Figure 6B:
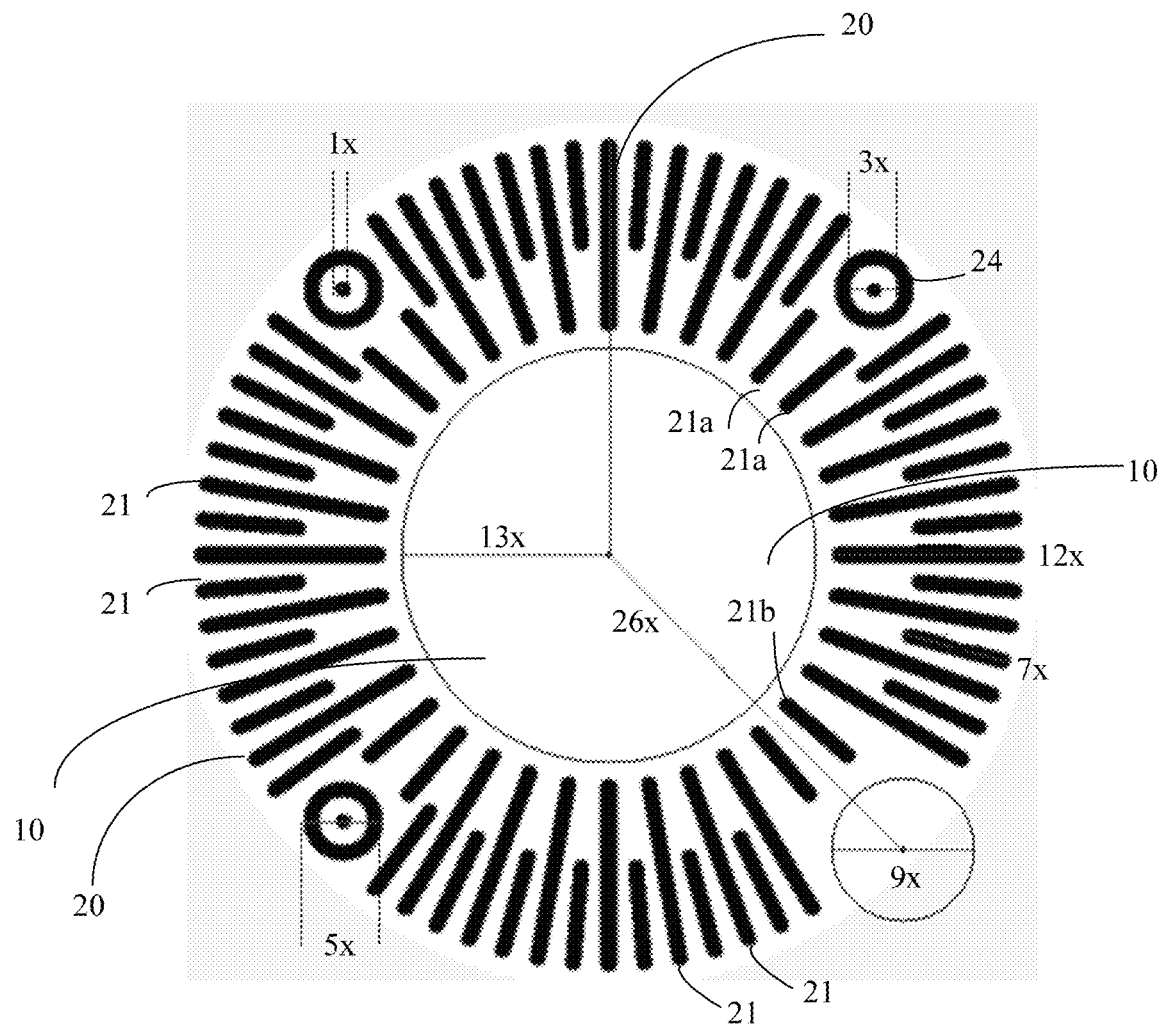
FIG. 6B is an example diagram of an example parameter of a two-dimensional code according to one or more implementations.

In some embodiments, code elements of the remaining region of the two-dimensional code other than the image region 10 may be aggregated to form a strip-shaped region with a first length and a strip-shaped region with a second length that are distributed in a staggered manner, the first length being greater than the second length. In other words, the code elements of the remaining region of the two-dimensional code other than the image region 10 may be aggregated to form a long strip-shaped region and a short strip-shaped region that are distributed in a staggered manner. As shown in FIG. 6B, the "12 o'clock" position (e.g., the top of the circle or 0 degrees) may be used as a start position, and a total of up to 72 or more strip-shaped regions with lengths distributed in a staggered manner are arranged according to a principle of an arranging one long strip-shaped region every 10 degrees or an integer multiple of 10 degrees and arranging one short strip-shaped region every 5 degrees or an integer multiple of 5 degrees along a clockwise direction. It should be noted that other patterns (such as the finder pattern 24) are disposed on extension paths of some strip-shaped regions (such as 21a or 21b in FIG. 6B). In this case, the lengths of the strip-shaped regions need to be adaptively adjusted according to the shapes of the other patterns, or even some strip-shaped regions are removed.

If only long strip-shaped regions are arranged, a relatively large quantity of blank regions are reserved between the long strip-shaped regions. Because the long strip-shaped regions are radially distributed, a larger distance from the image region indicates a larger blank region between adjacent long strip-shaped regions. To use the blank regions between adjacent long strip-shaped regions short strip-shaped regions are inserted between adjacent long strip-shaped regions. In this way, not only is the entire structure of the two-dimensional code more compact, but also the information capacity of the two-dimensional code is increased.

It should be understood that FIG. 6B is merely an example of a distribution scheme for strip-shaped regions. In fact, other distribution schemes may also be used. For example, the short strip-shaped regions shown in FIG. 6B may be removed, and only the long strip-shaped regions are reserved. Alternatively, the two-dimensional code may include a plurality of versions, and distribution schemes of strip-shaped regions corresponding to two-dimensional codes of different versions are different. For example, the two-dimensional code includes a version 1 and a version 2. In this illustrative example, the two-dimensional code of the version 1 uses a solution of distributing only long strip-shaped regions, and the two-dimensional code of the version 2 uses a solution of distributing long strip-shaped regions and short strip-shaped regions in a staggered scheme. When a user requires a relatively high information capacity of the two-dimensional code, the two-dimensional code of the version 2 may be used, and otherwise the two-dimensional code of the version 1 may be used.

To illustrate a distribution scheme for the at least two strip-shaped regions 21, in FIG. 6B, each of the at least two strip-shaped regions 21 is displayed as black. In actual use, because code elements in a same strip-shaped region 21 may include black pixels, may include white pixels, or pixels of virtually any color in scanable contrast to a background. For some generated two-dimensional codes, the strip-shaped region 21 may present a discontinuous state visually, as shown in FIG. 5 and FIG. 6A.

For example, the image region 10 may be rectangular or circular. In some embodiments, the image region 10 may be a pattern having a geometric center. Extension lines of the at least two strip-shaped regions 21 may pass through the geometric center of the image region 10.

The at least two strip-shaped regions 21 are in radially distributed around the image region 10. However, the spacing between the strip-shaped regions 21 is not specifically limited. For example, the at least two strip-shaped regions 21 may be uniformly distributed around the image region 10. That the at least two strip-shaped regions 21 are uniformly distributed around the image region 10 refers to that an angle formed by extension lines from any two adjacent strip-shaped regions in the at least two strip-shaped regions 21 is approximately the same as that of any two other adjacent strip-shaped regions.

The uniformly distributed strip-shaped regions can allow the entire structure of the two-dimensional code to be more compact, in some cases. When there is a relatively large quantity of strip-shaped regions distributed densely, the uniform distribution scheme can allow the two-dimensional code to have a larger information capacity.

The foregoing descriptions are illustrated using an example in which code elements aggregate to form strip-shaped regions 21. Other implementations are possible. For example, code elements in the two-dimensional code may aggregate to form a pattern of any shape. For example, code elements in the two-dimensional code may further aggregate to form one or more circles around the image region 10.

It should be noted that the encoding region 20 may be further divided into a plurality of regions. Functions of different regions may be different. The following makes detailed descriptions with reference to specific embodiments.

Optionally, in some embodiments, the encoding region 20 may include a format region, code elements in the format region may be used for recording format information of the two-dimensional code, The format information may include at least one of the following: version information, an error correction level, and mask information (for example, the mask information may refer to an identifier of a mask pattern used by the two-dimensional code). Further, in some embodiments, code elements in the format region may be distributed around the image region 10.

Using FIG. 5 as an example, an region formed by aggregating the code elements of each strip-shaped region that are closest to the image region 10 may be used as the format region. Code elements of the format region are approximately located in a circular region 22 surrounded by two dashed circles close to the image region 10 in FIG. 5.

The foregoing descriptions are illustrated by using an example in which code elements in the specific region are distributed around the image region 10. However, distribution forms of the format region and the code elements in the format region are not limited thereto. In fact, the format region may be any region in the encoding region 20. Code elements in the format region may also be distributed into any pattern or shape. For example, code elements in the format region may be located in two radially distributed strip-shaped regions.

For example, four error correction levels of the existing two-dimensional code may still be used, as shown in the foregoing Table 1, or new error correction levels may also be defined. For example, only three error correction levels: low, medium, and high are defined.

The encoding region 20 of the two-dimensional code includes the format regions, and may also include a codeword region. Codewords recorded in the codeword region may include data codes. Further, in some embodiments, codewords recorded in the codeword region may also include error correction codes.

Optionally, in some embodiments, the remaining region of the two-dimensional code other than the image region may further include an edge region, and code elements in the edge region may form a circular visual pattern. The code elements in the edge region may not necessarily store coding information of the two-dimensional code. The code elements may be used to recognize an edge of the two-dimensional code.

Using FIG. 5 as an example, the edge region is a region formed by aggregating the code elements in each strip-shaped region farthest from the image region 10. Code elements of the edge region are approximately located in the circular region 23 surrounded by two dashed circles away from the image region 10 in FIG. 5. The code elements form an approximately circular pattern. To ensure that the visibility of the circular pattern the pixels in the code elements may be black. However, other contrasting background/foreground colors may be used. In addition, to form the circular visual pattern, code elements in the edge are not required to be connected into a complete closed circle, provided that code elements in the edge region approximately present a circular shape on the whole.

Disposing the circular visual pattern in the edge region of the two-dimensional code can help an apparatus to recognize a two-dimensional code quickly. Further, it can also quicken the positioning of an edge of the two-dimensional code, to improve the efficiency of recognizing the two-dimensional code. Further, disposing the circular visual pattern in the edge region of the two-dimensional code can be more aesthetically pleasing.

Optionally, in some embodiments, as shown in FIG. 5, the two-dimensional code may include a plurality of finder patterns 24, and an outer profile of each finder pattern 24 may be a circle.

For example, a 1:1:3:1:1 design similar to that of an existing finder pattern may be used, or a 1:1:1:1:1 design shown in FIG. 5 may also be used. The 1:1:1:1:1 design can reduce the quantity of code elements occupied by the finder pattern. This may allow more code elements to be used for recording codeword information, to improve information capacity of the two-dimensional code.

Optionally, in some embodiments, as shown in FIG. 5, a target image 25 for recognizing a service type corresponding to the two-dimensional code may be further disposed in the remaining region of the two-dimensional code other than the image region 10.

The two-dimensional code may usually support different types of services, such as applets, payment codes, and personal cards. Different types of services may be identified by using different logos. For example, when information recorded by the two-dimensional code is a payment code, the target image 25 may be set to a logo corresponding to the payment code. When information recorded by the two-dimensional code is a personal card, the target image 25 may be set to a logo corresponding to the personal card.

In some embodiments, the target image 25 may be used as a correction image of the two-dimensional code. For example, the target image may be used for correcting the two-dimensional code together with the finder pattern of the two-dimensional code. For example, the profile of the finder pattern and the profile of the target image may both be circular profiles, and the vertex for correcting the two-dimensional code may be a center point of the circular profiles of the finder pattern and the target image.

The existing two-dimensional code includes a finder pattern and an alignment pattern that are formed by aggregation of code elements of fixed shapes and proportions. Before the two-dimensional code is identified, the two-dimensional code may be corrected based on the finder pattern and the alignment pattern. The finder pattern and the alignment pattern may be searched in the region of the two-dimensional code, and then positions of vertexes for correcting the two-dimensional code (for example, the vertexes may be center points of the finder pattern and the alignment pattern) are determined based on a relationship between positions of the finder pattern and the alignment pattern and positions of the vertexes (usually including four vertexes) for correcting the two-dimensional code. Next, the two-dimensional code may be corrected using the vertexes. For example, a perspective transformation may be performed on a matrix of the two-dimensional code by using the vertexes to convert the two-dimensional code to a corrected position.

The alignment pattern may be replaced with the target image. In this way, the target image not only implements a function of recognizing the service type of the two-dimensional code, but also implements a function of correcting the two-dimensional code. It should be understood that there may be a plurality of schemes for searching the target image. As shown in FIG. 5, a profile of the target image 25 may be set to a circular profile, and then edge detection of an image may be performed using a Sobel algorithm, to determine a position of the target image having the circular profile in the region of the two-dimensional code.

The existing two-dimensional code is corrected based on an alignment pattern. A function the same as that of an existing alignment pattern is implemented based on the target pattern 25.

For example, the profile of the target image 25 may be a circular profile, a rectangular profile, or a triangular profile.

A plurality of versions of the two-dimensional code may be set according to actual requirements. Different versions correspond to two-dimensional codes of different sizes. The following provides a specific scheme of selecting a size or a parameter of the two-dimensional code with reference to the examples shown in FIG. 6B. As shown in FIG. 6B, for example, the diameter of a small dot at the center of the finder pattern is 1×. Then, the diameter of an inner circumference of the finder pattern 24 may be set to 3×, and the diameter of an outer circumference may be set to 5×.

Further, as shown in FIG. 6B, the strip-shaped regions in radially distributed described above may be formed by long strip-shaped regions and short strip-shaped regions that are distributed in a staggered scheme. The length of the long strip-shaped region may be set to 12×, and the length of the short strip-shaped region may be set to 7×. Specifically, the 12 o'clock direction may be used as a start position, and 36 long strip-shaped regions 21 and 36 short strip-shaped regions 21 shown in FIG. 6B are arranged such that one long strip-shaped region is placed every 10 degrees and one short strip-shaped region is placed every 5 degrees along a clockwise direction. Certainly, if some scenarios have relatively low requirements for the information capacity of the two-dimensional code, only 36 long strip-shaped regions may be reserved, and 36 short strip-shaped regions may be removed. Other numbers of regions may be used.

Further, the radius of a pattern region 10 may be set to 13×. The diameter of a region in which the target image 25 is located may be set to 9×. In addition, as shown in FIG. 6B, without considering the impact of the target image 25, the two-dimensional code shown in FIG. 6B is circular, and the radius of the circle may be set to 26×.

As shown in FIG. 6B, the long strip-shaped region has a length of 12×, and can accommodate a total of 12 code elements. The code element in the 12 code elements that is closest to the image region 10 may be allocated to the format region for recording format information of the two-dimensional code. The code element in the 12 code elements farthest from the image region 10 may be allocated to the edge region, which may also contribute to the circular appearance of the code. Therefore, the quantity of code elements that can be used for recording codewords in each long strip-shaped region may be 10. Similarly, the short strip-shaped region has a length of 7×, and includes a total of seven code elements. The code element in the seven code elements farthest from the image region 10 may be allocated to the edge region. Therefore, the quantity of code elements that can be used for recording codewords in each long strip-shaped region is 6.

Further, considering that the finder pattern and the like occupy some of code elements of the two-dimensional code, there are approximately 500 code elements of the two-dimensional code that can be used for recording codewords. The encoding region 20 of the two-dimensional code may be formed by aggregation of the code elements. Further, error correction levels: L, M, Q, and H may be set for the two-dimensional code shown in FIG. 6B. Reference may be made to Table 1 for error correction capabilities of the error correction levels.

The two-dimensional codes are widely used on the Internet. Therefore, information stored in the two-dimensional code may include information in a URL format. Considering that the existing two-dimensional code does not support URL encoding and supports only common character encoding, a mapping relationship between information capacities of character and URL encoding schemes may be provided, so that the user makes a choice according to actual requirements. Descriptions are provided by using an example in which character encoding is 45 binary coding (e.g., 45 characters are represented using 45 different pre-defined binary codes), and URL encoding is 67 binary coding (descriptions are provided only by using an example in which the URL encoding is 67 binary encoding, and in fact, the URL encoding may also use other binaries), and a mapping relationship between information capacities of them is shown in Table 2.

TABLE 2

| Total bit quantity | Character encoding capacity (L, M, Q, H) | URL encoding (L, M, Q, H) |
|---|---|---|
| 500 | (68, 55, 41, 32) | (61, 49, 37, 28) |

As can be seen from Table 2, for the 45 binary character encoding, if an error correction level L is used, the 500-bit character capacity is usually 69 (or may be other values, and the value needs to be determined according to the length of a codeword corresponding to each character) and according to a conversion relation (Ln(45)/Ln(67)) between the 45 binary and the 67 binary, the URL character capacity of URL encoding is 61. Refer to the foregoing table for a correspondence between information capacities of character encoding and URL encoding under other error correction levels.

Assuming that an error correction level M is used, the URL character capacity of URL encoding is 49. 49 URL characters may be allocated according to the format shown in Table 3.

TABLE 3

| Version number | Service identifier | Http header mapping region | Service user-defined region |
|---|---|---|---|
| 1 URL character | 2 URL characters | 6 URL characters | 40 URL characters |

Service identifier: the service identifier occupies 2 URL characters, a total $67^2=4489$ possible service identifiers may be recorded. The service identifiers may be mainly used for distinguishing service types of information recorded in the two-dimensional code. Common service types include personal cards, applets, payment codes, and the like.

Http header mapping region: for a same manufacturer, http headers of a same service are usually the same. Therefore, the http header may be mapped into a relatively short identifier, and the identifier is recorded in the http header mapping region. During encoding, only an identifier corresponding to the http header needs to be encoded, and the entire http header does not need to be encoded.

Service user-defined region: a user may add personalized information to the service user-defined region, and a service user-defined region of 40 URL characters can satisfy use of the user.

Figure 7:
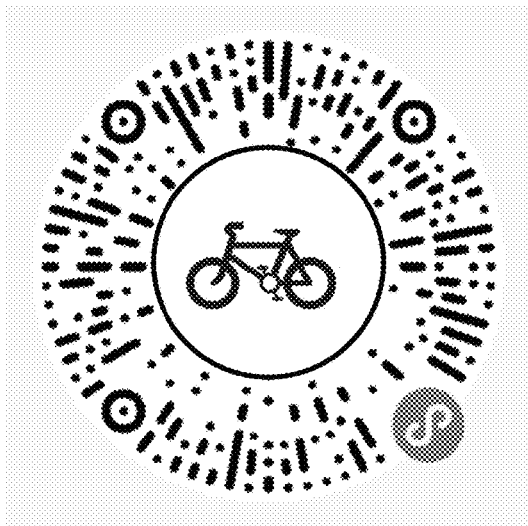
FIG. 7 is an example diagram of an example two-dimensional code according to one or more implementations.
Figure 7:
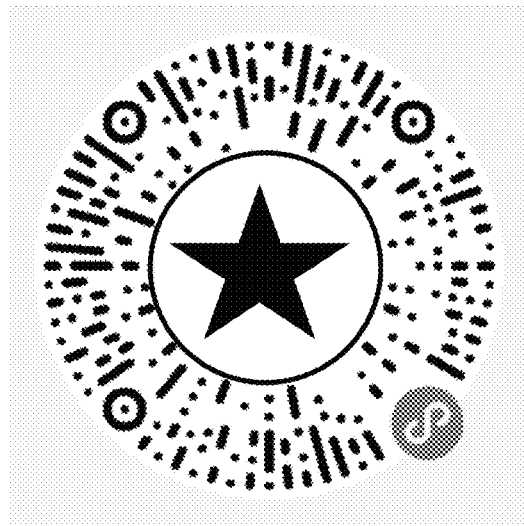
Figure 7:
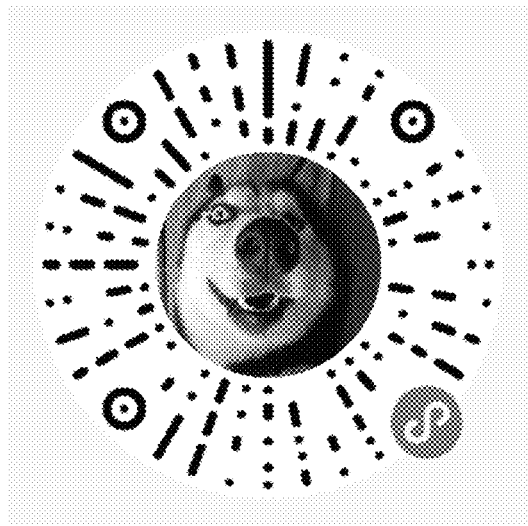
Figure 7:
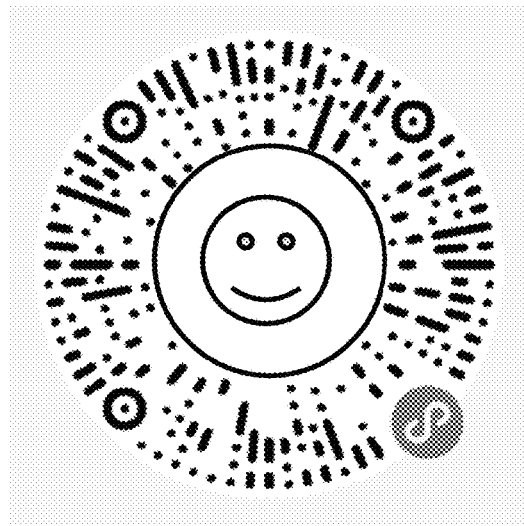

FIG. 7 shows an example two-dimensional code according to another various implementations. Similar to the two-dimensional code provided in the embodiment of FIG. 6B, the two-dimensional code of FIG. 7 also includes an image region and an encoding region that have no overlap. In the example shown in FIG. 7, two-dimensional codes on the upper left corner, the upper right corner, and the lower right corner all use a design solution that long and short strip-shaped regions are distributed in a staggered scheme, and the encoding region of the two-dimensional code on the lower left corner uses a design solution of only reserving long strip-shaped regions. Other implementations may use a printed matter, printed with the two-dimensional code described above.

For example, a two-dimensional code of an electronic version may be first made on a terminal (such as a mobile phone or a computer), and then a profile picture or a logo of a user is added to the image region in the two-dimensional code of the electronic version by using image-editing software, to obtain a to-be-printed two-dimensional code, and then the to-be-printed two-dimensional code is printed to form a printed matter.

For example, the material of the printed matter may be one or more of paper, plastic, and metal. The printed matter may be printed by using one or more of printing technologies such as mimeographing, letterpress printing, and offset printing.

The two-dimensional code has a radial structure formed by a plurality of strip-shaped regions. A blank region exists between the strip-shaped regions. After the two-dimensional code is printed to the printed matter, the user may print or add other patterns or text between the strip-shaped regions according to actual requirements.

It should be noted that when the two-dimensional code includes an image region, the first image in the image region may be printed with the two-dimensional code, or may be separately printed and then attached to the image region of the two-dimensional code.

The example two-dimensional code is described above in detail with reference to FIG. 5 to FIG. 7. An apparatus and terminal for recognizing a two-dimensional code are described below in detail with reference to the example shown in FIG. 8 to FIG. 11. It should be understood that the apparatus for recognizing a two-dimensional code and the terminal provided in the examples of FIG. 8 to FIG. 11 may be configured to recognize the two-dimensional code described above.

Figure 8:
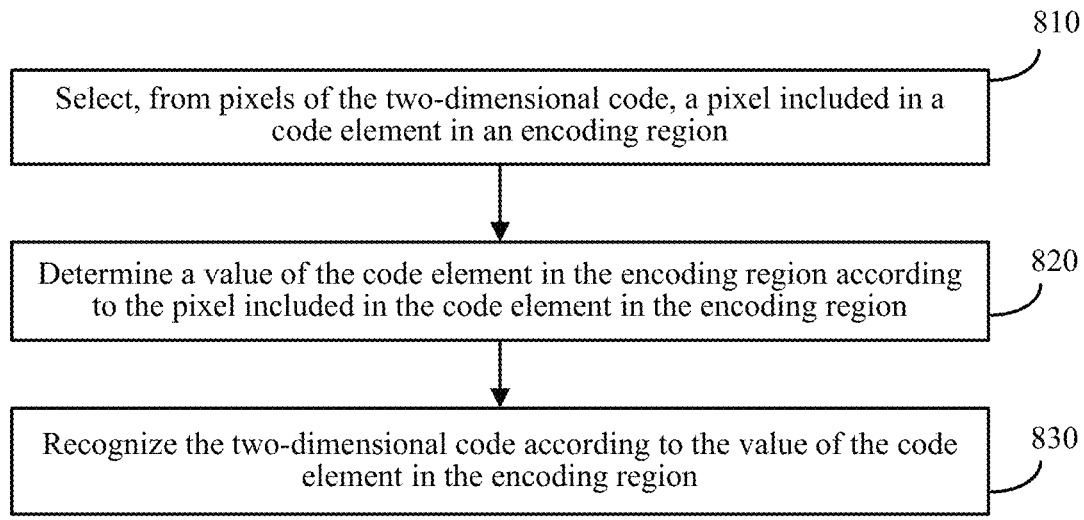
FIG. 8 is a schematic flowchart of an example method for recognizing a two-dimensional code according to one or more implementations.

FIG. 8 is a schematic flowchart of an example method for recognizing a two-dimensional code. The example method includes selecting, from pixels of the two-dimensional code, a pixel included in a code element in an encoding region (810). It should be understood that the two-dimensional code is also an image. Therefore, the two-dimensional code may also be referred to as a two-dimensional code image. The two-dimensional code image consists of pixels.

Optionally, in some embodiments, if the to-be-identified two-dimensional code is located outside a terminal (for example, a mobile phone), the two-dimensional code may be obtained by photographing by using a photographing device (for example, a camera). For example, when the two-dimensional code is printed, the printed material may be photographed (e.g., using a camera, mobile device, or other photographic device) to obtain the two-dimensional code. For another example, when the two-dimensional code is located on a display interface of another terminal, the display interface of the another terminal may be photographed (or scanned) to obtain the two-dimensional code.

Optionally, in some other embodiments, if the to-be-identified two-dimensional code is located on a display interface of the terminal, the two-dimensional code may be obtained by means of screenshot, downloading, and the like. For example, when a picture of the two-dimensional code appears on a webpage currently accessed by the terminal, the two-dimensional code may be obtained by means of downloading. For another example, if the two-dimensional code appears in an article currently being read by the terminal, or appears in a chat session established by the terminal and another terminal, the two-dimensional code may be obtained by means of screenshot.

Continuing to refer to FIG. 8, the method may further include determining a value of the code element in the encoding region according to the pixel included in the code element in the encoding region (820, the code element may include a plurality of pixels).

For example, an index may be preset for the code element in the code element region, and a correspondence between the index of the code element in the code element region and the index of the pixel of the two-dimensional code.

In some cases, a value of the code element may be binary 0 or 1.

Continuing to refer to FIG. 8, the method may further include recognizing the two-dimensional code according to the value of the code element in the encoding region.

The two-dimensional may be a two-dimensional code of virtually any shape with the area to house the code elements. The code elements of the two-dimensional code may be aggregated into virtually any shape. In an actual identification process, the correspondence between the pixel of the two-dimensional code and the code element in the encoding region may be established by using step 810, where one code element may include one pixel, or may include a plurality of pixels. Then, whether the code element records binary 0 or binary 1 may be determined according to the color of the pixel corresponding to the code element in the encoding region. For example, a particular code element in the encoding region includes three pixels, and two of them are black, and one is white. Then the code element may indicate binary 1. For another example, a particular code element in the encoding region includes three pixels, which are all white, and the code element may indicate binary 0.

A mapping relationship between code elements and pixels is established in a scheme of determining the pixels included in the code elements in the encoding region. Accordingly, normalization operation does not necessarily need to be performed on the two-dimensional code. In this way, the conversion time for recognizing the two-dimensional code can be reduced, and an error probability can be reduced.

Further, in the process of recognizing the two-dimensional code it is not necessarily required that one code element corresponds to one pixel. Therefore, the system can be used for recognizing a two-dimensional code of any shape. In other words, various implementations may provide improvements over existing method market-based solutions for recognizing the two-dimensional codes. A user may design various types of two-dimensional codes according to actual requirements, and the two-dimensional code may use shapes other than and including the rectangular two-dimensional codes.

Optionally, in some embodiments, the two-dimensional code may include an image region and the encoding region, the image region and the encoding region having no overlap.

The two-dimensional code is provided with an image region and an encoding region that have no overlap. Therefore, an image inserted into the image region does not block a code element of the two-dimensional code. Compared with an existing solution of inserting an image into the two-dimensional code, the quantity of codewords that need to be corrected, thereby improving the efficiency of recognizing a two-dimensional code. Further, the two-dimensional code does not destroy a pattern formed by code elements in the two-dimensional code, to maintain the integrity of the two-dimensional code.

Optionally, in some embodiments, step 810 may include: dividing the code region according to pre-recorded position information, to obtain a region occupied by each code element in the encoding region. The position information may be used to indicate a position of each code element in the encoding region. In some cases, step 810 may further include selecting, from the pixels of the two-dimensional code, pixels falling into the region occupied by each code element, as pixels included in each code element.

Pixels included in each code element are determined by means of dividing the encoding region in real time. Using FIG. 6A as an example, in a process of recognizing the two-dimensional code, the encoding region of the two-dimensional code may be divided into lots of small grids similar to those shown in FIG. 6A, each small grid corresponding to an region by one code element. Then pixels falling into a region occupied by each code elements are used as pixels included in the code element.

Optionally, in some embodiments, step 810 may include determining a pixel included in each code element by querying a pre-established mapping relationship according to an identifier of each code element in the encoding region. The mapping relationship may be a mapping relationship between the identifier of each code element and the pixel included in each code element in the two-dimensional code.

The region of the two-dimensional code does not need to be divided, and only a mapping relationship between positions of each code element and a pixel may need to be pre-recorded. For example, assuming that the two-dimensional code includes a code element n, and an region occupied by the code element n includes three pixels of the two-dimensional code, a mapping relationship between positions of the code element n and the three pixels (for example, row and column coordinates of the pixels in the image of the two-dimensional code) may be pre-recorded. In a process of recognizing the two-dimensional code, three pixels corresponding to the code element n may be searched directly based on the pre-recorded mapping relationship, and the two-dimensional code is identified based on colors of the three pixels.

Optionally, in some embodiments, one code element in the encoding region includes at least two pixels.

Optionally, in some embodiments, a remaining region of the two-dimensional code other than the image region may include at least two strip-shaped regions formed by aggregation of code elements of the two-dimensional code. The image region may be located in the middle of the at least two strip-shaped regions The at least two strip-shaped regions may be radially distributed around the image region.

Code elements of the two-dimensional code aggregate to form a plurality of strip-shaped regions. The plurality of strip-shaped regions is radially distributed. A blank region may be reserved between the strip-shaped regions. A user may dispose some other patterns or text in the blank region according to actual requirements, to increase the amount of information that the two-dimensional code can provide to the user. In addition, the radially distributed two-dimensional code may be aesthetically pleasing.

Optionally, in some embodiments, a target image for recognizing a service type corresponding to the two-dimensional code is further disposed in the remaining region of the two-dimensional code.

Optionally, in some embodiments, the example method in FIG. 8 may further include searching, in the remaining region of the two-dimensional code other than the image region, for a finder pattern of the two-dimensional code and the target image. In some cases, the method may further include determining, according to positions of the finder pattern and the target image, positions of a plurality of vertexes for correcting the two-dimensional code. In some cases, the method may further include correcting the two-dimensional code according to the positions of the plurality of vertexes.

Optionally, in some embodiments, the finder pattern and the target image may have circular profiles. In some cases, the determining, according to positions of the finder pattern and the target image, positions of a plurality of vertexes for correcting the two-dimensional code may include determining a position of a center point of the circular profile of the finder pattern and a position of a center point of the circular profile of the target image as the positions of the plurality of vertexes.

Compared with other shapes, it may be computationally less complex to search and position circular profiles, This can accelerate the positioning and correction processes used in recognition. Accordingly, the efficiency of recognizing the two-dimensional code may be increased.

Optionally, in some embodiments, the encoding region includes a format region, code elements in the format region are distributed around the image region. The code elements in the format region are used for recording format information of the two-dimensional code The format information includes at least one of the following: version information, an error correction level, and mask information.

Recognition of the two-dimensional code according to the value of the code element in the encoding region may include obtaining the format information of the two-dimensional code according to the value of the code element in the format region. In some cases, recognition may further include recognizing the two-dimensional code according to the format information of the two-dimensional code.

Optionally, in some embodiments, the at least two strip-shaped regions are evenly distributed around the image region.

The uniformly distributed strip-shaped regions can allow the entire structure of the two-dimensional code to be more compact. When there is a relatively large quantity of strip-shaped regions distributed densely, the uniform distribution scheme can allow the two-dimensional code to have a larger information capacity.

Optionally, in some embodiments, the at least two strip-shaped regions include a strip-shaped region with a first length and a strip-shaped region with a second length that are distributed in a staggered scheme. The first length may be greater than the second length.

In other words, code elements of the two-dimensional code may be aggregated to form a long strip-shaped region and a short strip-shaped region that are distributed in a staggered scheme. If only long strip-shaped regions are arranged, in some case, a relatively large quantity of blank regions may be reserved between the long strip-shaped regions. By arranging short strip-shaped regions between the long strip-shaped regions, the blank regions between two long strip-shaped regions can be used. In this way, not only the entire structure of the two-dimensional code is more compact, but also the information capacity of the two-dimensional code is increased.

Optionally, in some embodiments, the image region is a circular region or a rectangular region.

Optionally, in some embodiments, the two-dimensional code includes an edge region, and code elements in the edge region form a circular visual pattern.

Optionally, in some embodiments, an image set in the image region is a profile picture or a logo of a user of the two-dimensional code.

Figure 9:
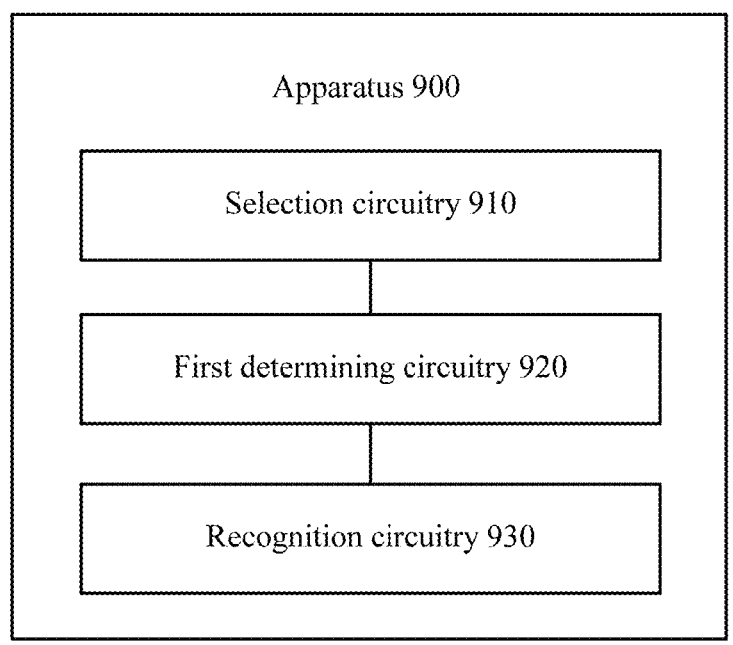
FIG. 9 is a schematic structural diagram of an example apparatus for recognizing a two-dimensional code according to one or more implementations.

FIG. 9 is a schematic structural diagram of an example apparatus for recognizing a two-dimensional code. The apparatus 900 of FIG. 9 can be configured to execute steps in the method in FIG. 8. The apparatus 900 includes selection circuitry 910, configured to select, from pixels of the two-dimensional code, a pixel included in a code element in an encoding region.

The apparatus 900 may further include first determining circuitry 920, configured to determine a value of the code element in the encoding region according to the pixel included in the code element in the encoding region.

The apparatus 900 may further include recognition circuitry 930, configured to recognize the two-dimensional code according to the value of the code element in the encoding region.

A mapping relationship between code elements and pixels is established in a scheme of determining the pixels included in the code elements in the encoding region, and a normalization operation does not need to be performed on the two-dimensional code. In this way, the time used in the conversion operation can be reduced, and an recognition error probability can be reduced.

Further, in the process of recognizing the two-dimensional code it is not necessarily required that one code element corresponds to one pixel. Therefore, this implementation can be used for recognizing a two-dimensional code of any shape. A user may design various types of two-dimensional codes according to actual requirements, so that the shape of the two-dimensional code is more flexible.

Optionally, in some embodiments, the two-dimensional code may include an image region and the encoding region, the image region and the encoding region having no overlap.

The two-dimensional code includes an image region and an encoding region that have no overlap. Therefore, an image inserted into the image region does not block a code element of the two-dimensional code. Compared with an existing solution of inserting an image into the two-dimensional code, this implementation can reduce the quantity of codewords that need to be corrected, thereby improving the efficiency of recognizing a two-dimensional code. Further, the two-dimensional code does not destroy a pattern formed by code elements in the two-dimensional code, to maintain the integrity of the two-dimensional code.

Optionally, in some embodiments, the selection circuitry 910 may be configured to divide the code region according to pre-recorded position information, to obtain an region occupied by each code element in the encoding region The position information may be used to indicate a position of each code element in the encoding region. The selection circuitry may be further configured to select, from the pixels of the two-dimensional code, pixels falling into the region occupied by each code element, as pixels included in each code element.

Optionally, in some embodiments, the selection circuitry 910 may be configured to determine a pixel included in each code element by querying a pre-established mapping relationship according to an identifier of each code element in the encoding region. The mapping relationship may be a mapping relationship between the identifier of each code element and the pixel included in each code element in the two-dimensional code.

Optionally, in some embodiments, one code element in the encoding region includes at least two pixels.

Optionally, in some embodiments, a remaining region of the two-dimensional code other than the image region includes at least two strip-shaped regions formed by aggregation of code elements of the two-dimensional code. The image region may be located in the middle of the at least two strip-shaped regions. The at least two strip-shaped regions may be radially distributed around the image region.

Code elements of the two-dimensional code be aggregated to form a plurality of strip-shaped regions. The plurality of strip-shaped regions may be radially distributed. A blank region is reserved between the strip-shaped regions. A user may dispose some other patterns or text in the blank region according to actual requirements, to increase the amount of information that the two-dimensional code can provide to the user. In addition, the circularly shaped two-dimensional code may be aesthetically pleasing.

Optionally, in some embodiments, a target image for recognizing a service type corresponding to the two-dimensional code is further disposed in the remaining region of the two-dimensional code.

Optionally, in some embodiments, the apparatus 900 may further include searching circuitry, configured to search, in the remaining region of the two-dimensional code, for a finder pattern of the two-dimensional code and the target image. In some cases, the apparatus 900 may further include second determining circuitry, configured to determine, according to positions of the finder pattern and the target image, positions of a plurality of vertexes for correcting the two-dimensional code. In some cases, the apparatus 900 may further include correction circuitry, configured to correct the two-dimensional code according to the positions of the plurality of vertexes.

Optionally, in some embodiments, the finder pattern and the target image have circular profiles, and the correction circuitry may be configured to determine a position of a center point of the circular profile of the finder pattern and a position of a center point of the circular profile of the target image as the positions of the plurality of vertexes.

Optionally, in some embodiments, the encoding region includes a format region, code elements in the format region are distributed around the image region. The code elements in the format region are used for recording format information of the two-dimensional code. The format information may include at least one of the following information: version information, an error correction level, and mask information. The recognition circuitry 930 may be configured to obtain the format information of the two-dimensional code according to the value of the code element in the format region. In some cases, the recognition circuitry may be further configured to recognize the two-dimensional code according to the format information of the two-dimensional code.

Optionally, in some embodiments, the at least two strip-shaped regions are evenly distributed around the image region.

The uniformly distributed strip-shaped regions can allow the entire structure of the two-dimensional code to be more compact. When there is a relatively large quantity of strip-shaped regions distributed densely, the uniform distribution scheme can allow the two-dimensional code to have a larger information capacity.

Optionally, in some embodiments, the at least two strip-shaped regions include a strip-shaped region with a first length and a strip-shaped region with a second length that are distributed in a staggered scheme. The first length may be greater than the second length.

In other words, code elements of the two-dimensional code may be aggregated to form a long strip-shaped region and a short strip-shaped region that are distributed in a staggered scheme. If only long strip-shaped regions are arranged, a relatively large quantity of blank regions may be reserved between the long strip-shaped regions. By arranging short strip-shaped regions between the long strip-shaped regions, the blank regions between two long strip-shaped regions can be used. In this way, not only the entire structure of the two-dimensional code is more compact, but also the information capacity of the two-dimensional code is increased. Optionally, in some embodiments, the image region is a circular region or a rectangular region. Optionally, in some embodiments, the two-dimensional code includes an edge region, and code elements in the edge region form a circular visual pattern. Optionally, in some embodiments, an image set in the image region is a profile picture or a logo of a user of the two-dimensional code.

Figure 10:
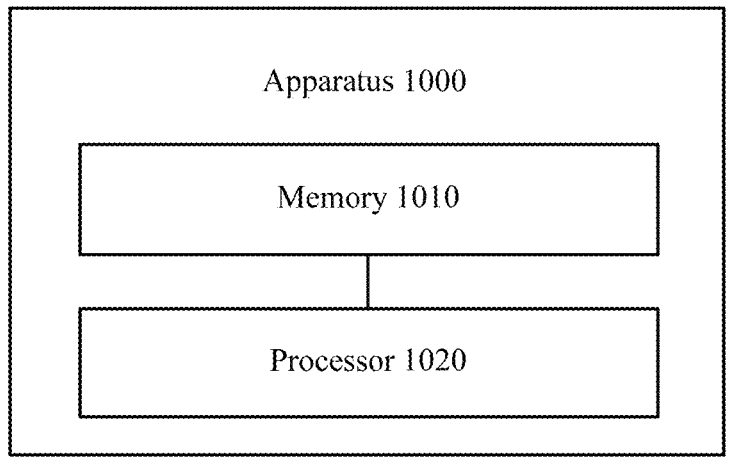
FIG. 10 is a schematic structural diagram of an example apparatus for recognizing a two-dimensional code according to one or more implementations.

FIG. 10 is a schematic structural diagram of an example apparatus for recognizing a two-dimensional code. The apparatus 1000 of FIG. 10 can be configured to execute steps in the method in FIG. 8. The apparatus 1000 includes a memory 1010, configured to store a program (e.g., computer instructions). The apparatus may further include a processor 1020, configured to execute the program stored in the memory 1010. Execution of the program may cause the processor to perform selecting, from pixels of the two-dimensional code, a pixel included in a code element in an encoding region.

Execution of the program may cause the processor to further perform determining a value of the code element in the encoding region according to the pixel included in the code element in the encoding region.

Execution of the program may cause the processor to further perform recognizing the two-dimensional code according to the value of the code element in the encoding region.

A mapping relationship between code elements and pixels is established in a scheme of determining the pixels included in the code elements in the encoding region. In some cases, a normalization operation does not necessarily need to be performed on the two-dimensional code. In this way, the conversion time used in the process of recognizing the two-dimensional code can be reduced, and an error probability of the process of can be reduced.

Further, in the process of recognizing the two-dimensional code it is not required that one code element corresponds to one pixel. Therefore, this implementation can be used for recognizing a two-dimensional code of any shape. A user may design various types of two-dimensional codes according to actual requirements, so that the shape of the two-dimensional code is more flexible.

Optionally, in some embodiments, the two-dimensional code may include an image region and the encoding region, the image region and the encoding region having no overlap.

The two-dimensional code includes an image region and an encoding region that have no overlap. Therefore, an image inserted into the image region does not block a code element of the two-dimensional code. Compared with existing solutions for inserting an image into the two-dimensional code, this implementation can reduce the quantity of codewords that need to be corrected, thereby improving the efficiency of recognizing a two-dimensional code. Further, the two-dimensional code does not destroy a pattern formed by code elements in the two-dimensional code, to maintain the integrity of the two-dimensional code.

Optionally, in some embodiments, the processor 1020 may be configured to divide the code region according to pre-recorded position information, to obtain an region occupied by each code element in the encoding region. The position information being used to indicate a position of each code element in the encoding region. The processor may be further configured to select, from the pixels of the two-dimensional code, pixels falling into the region occupied by each code element, as pixels included in each code element.

Optionally, in some embodiments, the processor 1020 may be configured to determine a pixel included in each code element by querying a pre-established mapping relationship according to an identifier of each code element in the encoding region. The mapping relationship may be a mapping relationship between the identifier of each code element and the pixel included in each code element in the two-dimensional code.

Optionally, in some embodiments, one code element in the encoding region includes at least two pixels.

Optionally, in some embodiments, a remaining region of the two-dimensional code other than the image region includes at least two strip-shaped regions formed by aggregating the code elements of the two-dimensional code. The image region may be located in the middle of the at least two strip-shaped regions. The at least two strip-shaped regions may be radially distributed around the image region.

Code elements of the two-dimensional code may be aggregated to form a plurality of strip-shaped regions. The plurality of strip-shaped regions may be radially distributed. A blank region is reserved between the strip-shaped regions. A user may dispose some other patterns or text in the blank region according to actual requirements, to increase the amount of information that the two-dimensional code can provide to the user. In addition, the circularly shaped two-dimensional code may be aesthetically pleasing.

Optionally, in some embodiments, a target image for recognizing a service type corresponding to the two-dimensional code is further disposed in the remaining region of the two-dimensional code other than the image region.

Optionally, in some embodiments, the processor 1020 may be further configured to execute the following operations: searching, in the remaining region of the two-dimensional code other than the image region, for a finder pattern of the two-dimensional code and the target image; determining, according to positions of the finder pattern and the target image, positions of a plurality of vertexes for correcting the two-dimensional code; and correcting the two-dimensional code according to the positions of the plurality of vertexes.

Optionally, in some embodiments, the finder pattern and the target image have circular profiles, and the determining, according to positions of the finder pattern and the target image, positions of a plurality of vertexes for correcting the two-dimensional code may include: determining a position of a center point of the circular profile of the finder pattern and a position of a center point of the circular profile of the target image as the positions of the plurality of vertexes.

Optionally, in some embodiments, the encoding region includes a format region, code elements in the format region are distributed around the image region, and the code elements in the format region are used for recording format information of the two-dimensional code, and the format information includes at least one of the following information of the two-dimensional code: version information, an error correction level, and mask information, and the recognizing the two-dimensional code according to the value of the code element in the encoding region may include: obtaining the format information of the two-dimensional code according to the value of the code element in the format region; and recognizing the two-dimensional code according to the format information of the two-dimensional code.

Optionally, in some embodiments, the at least two strip-shaped regions are evenly distributed around the image region.

The uniformly distributed strip-shaped regions can allow the entire structure of the two-dimensional code to be more compact and proper. When there is a relatively large quantity of strip-shaped regions distributed densely, the uniform distribution scheme can allow the two-dimensional code to have a larger information capacity.

Optionally, in some embodiments, the at least two strip-shaped regions include a strip-shaped region with a first length and a strip-shaped region with a second length that are distributed in a staggered scheme, the first length being greater than the second length.

In other words, code elements of the two-dimensional code may aggregate to form a long strip-shaped region and a short strip-shaped region that are distributed in a staggered scheme. If only long strip-shaped regions are arranged, a relatively large quantity of blank regions are reserved between the long strip-shaped regions. By arranging short strip-shaped regions between the long strip-shaped regions, the blank regions between two long strip-shaped regions can be sufficiently used. In this way, not only the entire structure of the two-dimensional code is more compact, but also the information capacity of the two-dimensional code is increased. Optionally, in some embodiments, the image region is a circular region or a rectangular region.

Optionally, in some embodiments, the two-dimensional code includes an edge region, and code elements in the edge region form a circular visual pattern.

Optionally, in some embodiments, an image set in the image region is a profile picture or a logo of a user of the two-dimensional code.

Figure 11:
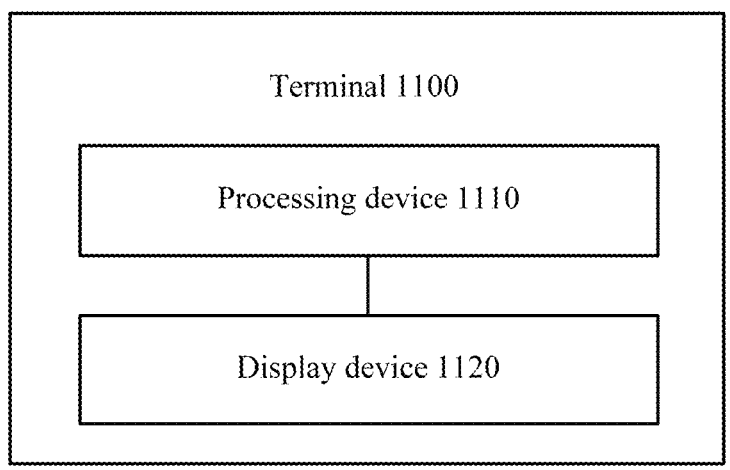
FIG. 11 is a schematic structural diagram of an example terminal according to one or more implementations.

FIG. 11 is a schematic structural diagram of an example terminal. The terminal 1100 of FIG. 11 may be configured to execute steps in the method described in FIG. 8. Therefore, reference may be made to the previous method embodiments for the part that is not described in detail. The terminal 1100 includes The terminal 1100 includes a processing device 1110, configured to: select, from pixels of a two-dimensional code, a pixel included in a code element in an encoding region; determine a value of the code element in the encoding region according to the pixel included in the code element in the encoding region; and recognize the two-dimensional code according to the value of the code element in the encoding region; and The terminal 1100 includes a display device 1120, configured to display an identification result of the two-dimensional code.

In some embodiments, the identification result of the two-dimensional code may be original data before encoding; in some other embodiments, the identification result of the two-dimensional code may be a web page after jumping; and in some other embodiments, the identification result of the two-dimensional code may be information about successful payment.

A mapping relationship between code elements and pixels is established in a scheme of determining the pixels included in the code elements in the encoding region, and a normalization operation does not need to be performed on the two-dimensional code. In this way, the quantity of times of conversion operation that needs to be executed in the process of recognizing the two-dimensional code can be reduced, and an error probability in the process of recognizing the two-dimensional code can be reduced.

Further, in the process of recognizing the two-dimensional code it is not necessarily required that one code element corresponds to one pixel. Therefore, this implementation can be used for recognizing a two-dimensional code of any shape. A user may design various types of two-dimensional codes according to actual requirements, so that the shape of the two-dimensional code is more flexible.

Optionally, in some embodiments, the two-dimensional code may include an image region and the encoding region, the image region and the encoding region having no overlap.

The two-dimensional code includes an image region and an encoding region that have no overlap. Therefore, an image inserted into the image region does not block a code element of the two-dimensional code. Compared with an existing solution of inserting an image into the two-dimensional code, this implementation can reduce the quantity of codewords that need to be corrected, thereby improving the efficiency of recognizing a two-dimensional code. Further, the two-dimensional code does not destroy a pattern formed by code elements in the two-dimensional code, to maintain the integrity of the two-dimensional code.

Optionally, in some embodiments, the processing device 1110 may be configured to: divide the code region according to pre-recorded position information, to obtain an region occupied by each code element in the encoding region. The position information may be used to indicate a position of each code element in the encoding region; In some cases, the processing device may be further configured to select, from the pixels of the two-dimensional code, pixels falling into the region occupied by each code element, as pixels included in each code element.

Optionally, in some embodiments, the processing device 1110 may be configured to determine a pixel included in each code element by querying a pre-established mapping relationship according to an identifier of each code element in the encoding region. The mapping relationship may be a mapping relationship between the identifier of each code element and the pixel included in each code element in the two-dimensional code.

Optionally, in some embodiments, one code element in the encoding region includes at least two pixels.

Optionally, in some embodiments, the terminal 1100 may further include a photographic device, configured to photograph the two-dimensional code and transmit the photographed two-dimensional code to the processing device 1110.

Optionally, in some embodiments, a remaining region of the two-dimensional code other than the image region includes at least two strip-shaped regions formed by aggregating the code elements of the two-dimensional code. The image region may be located in the middle of the at least two strip-shaped regions. The at least two strip-shaped regions may be radially distributed around the image region.

Code elements of the two-dimensional code may be aggregated to form a plurality of strip-shaped regions. The plurality of strip-shaped regions may be radially distributed. A blank region is reserved between the strip-shaped regions. A user may dispose some other patterns or text in the blank region according to actual requirements, to increase the amount of information that the two-dimensional code can provide to the user. In addition, the circularly shaped two-dimensional code may be aesthetically pleasing.

Optionally, in some embodiments, a target image for recognizing a service type corresponding to the two-dimensional code is further disposed in the remaining region of the two-dimensional code.

Optionally, in some embodiments, the processing device 1110 may be further configured to search, in the remaining region of the two-dimensional code for a finder pattern of the two-dimensional code and the target image. The remaining region may be other than the image region in this and other implementations. In some cases, the processing device 1110 may further be configured to determine, according to positions of the finder pattern and the target image, positions of a plurality of vertexes for correcting the two-dimensional code. In some cases, the processing device 1110 may further be configured to correct the two-dimensional code according to the positions of the plurality of vertexes.

Optionally, in some embodiments, the finder pattern and the target image have circular profiles. The processing device 1110 may be configured to determine a position of a center point of the circular profile of the finder pattern and a position of a center point of the circular profile of the target image as the positions of the plurality of vertexes.

Optionally, in some embodiments, the encoding region includes a format region, code elements in the format region are distributed around the image region. The code elements in the format region may be used to recording format information of the two-dimensional code. In some cases, the format information includes at least one of the following: version information, an error correction level, and mask information. In some cases, the processing device 1110 may be configured to obtain the format information of the two-dimensional code according to the value of the code element in the format region. In some cases, the processing device 1110 may be configured to recognize the two-dimensional code according to the format information of the two-dimensional code.

Optionally, in some embodiments, the at least two strip-shaped regions are evenly distributed around the image region.

The uniformly distributed strip-shaped regions can allow the entire structure of the two-dimensional code to be more compact. When there is a relatively large quantity of strip-shaped regions distributed densely, the uniform distribution scheme can allow the two-dimensional code to have a larger information capacity.

Optionally, in some embodiments, the at least two strip-shaped regions include a strip-shaped region with a first length and a strip-shaped region with a second length that are distributed in a staggered scheme. The first length may be greater than the second length.

In other words, code elements of the two-dimensional code may be aggregated to form a long strip-shaped region and a short strip-shaped region that are distributed in a staggered scheme. If only long strip-shaped regions are arranged, a relatively large quantity of blank regions are reserved between the long strip-shaped regions. By arranging short strip-shaped regions between the long strip-shaped regions, the blank regions between two long strip-shaped regions can be used. In this way, not only the entire structure of the two-dimensional code is more compact, but also the information capacity of the two-dimensional code is increased. Optionally, in some embodiments, the image region may be a circular region or a rectangular region.

Optionally, in some embodiments, the two-dimensional code may include an edge region, and code elements in the edge region form a circular visual pattern.

Optionally, in some embodiments, an image set in the image region is a profile picture or a logo of a user of the two-dimensional code.

Optionally, in some embodiments, the terminal is a mobile terminal.

In the foregoing embodiments, implementation may be entirely or partially performed by using software, hardware, firmware or any combination thereof. When software is used for implementation, implementation may be entirely or partially performed in the form of a computer program product. The computer program product includes one or more computer instructions. When the computer program instructions are loaded and executed on a computer, all or some of the processes or functions may be produced. The computer may be a general-purpose computer, a special-purpose computer, a computer network, or another programmable apparatus. The computer instructions may be stored in a computer readable storage medium or transmitted from one computer readable storage medium to another computer readable storage medium. For example, the computer instructions may be transmitted from one website, computer, server or data center to another website, computer, server or data center in a wired (for example, a coaxial cable, an optical fiber or a digital subscriber line (DSL)) or wireless (for example, infrared, wireless or microwave) scheme. The computer readable storage medium may be any available medium capable of being accessed by a computer or include one or more data storage devices integrated by an available medium, such as a server and a data center. The available medium may be a magnetic medium (such as a floppy disk, a hard disk, or a magnetic tape), an optical medium (such as a digital video disc (DVD)), a semiconductor medium (such as a solid state disk (SSD)) or the like.

In combination with the examples described in the embodiments disclosed in this specification, code elements and algorithm steps may be implemented by electronic hardware or a combination of computer software and electronic hardware. Whether the functions are performed by hardware or software depends on particular applications and design constraint conditions of the technical solutions. Different methods may be used to implement the described functions for each particular application.

Although multiple embodiments are expressly provided, it should be understood that the disclosed system, apparatus, and method may be implemented in other schemes. The described apparatus embodiments are illustrative. For example, the code element division is a logical function division and may other divisions may be used in various implementations. For example, a plurality of code elements or components may be combined or integrated into another system, or some features may be ignored or not performed. In addition, the displayed or discussed mutual couplings or direct couplings or communication connections may be implemented using some interfaces. The indirect couplings or communication connections between the apparatuses or code elements may be implemented in electronic, mechanical, or other forms.

The code elements described as separate parts may or may not be physically separate. The parts displayed as code elements may or may not be physical code elements. The code elements may be located in one position or may be distributed on a plurality of network code elements. Some of or all of the code elements may be selected according to actual needs to achieve the objectives of the solutions of the embodiments.

In addition, functional code elements may be integrated into one processing code element, or each of the code elements may exist alone physically. Two or more code elements may be integrated into one code element.

Various implementations are described. Other implementations are possible.

What is claimed is:

1. A method for recognizing a circular two-dimensional code, comprising:
    selecting, from pixels of the circular two-dimensional code, a pixel comprised in a code element in an encoding region, the circular two-dimensional code comprising an image region and the encoding region, and the image region and the encoding region having no overlap;
    determining a value of the code element in the encoding region according to the pixel comprised in the code element in the encoding region; and
    recognizing the circular two-dimensional code according to the value of the code element in the encoding region.

2. The method according to claim 1, wherein a remaining region of the circular two-dimensional code other than the image region comprises at least two strip-shaped regions formed by aggregating code elements of the circular two-dimensional code, the image region being located in the middle of the at least two strip-shaped regions, and the at least two strip-shaped regions being radially distributed around the image region.

3. The method according to claim 2, wherein the at least two strip-shaped regions are evenly distributed around the image region.

4. The method according to claim 3, wherein the at least two strip-shaped regions comprise a strip-shaped region with a first length and a strip-shaped region with a second length that are distributed in a staggered scheme, the first length being greater than the second length.

5. The method according to claim 1, wherein a target image for recognizing a service type corresponding to the circular two-dimensional code is further disposed in the remaining region of the circular two-dimensional code other than the image region.

6. The method according to claim 5, wherein the method further comprises:
    searching, in the remaining region of the circular two-dimensional code other than the image region, for a finder pattern of the circular two-dimensional code and the target image;
    determining, according to positions of the finder pattern and the target image, a position of a vertex for correcting the circular two-dimensional code; and
    correcting the circular two-dimensional code according to the position of the vertex for correcting the circular two-dimensional code.

7. The method according to claim 6, wherein the finder pattern and the target image have circular profiles, and
    the determining, according to positions of the finder pattern and the target image, a position of a vertex for correcting the circular two-dimensional code comprises:
    determining a position of a center point of the circular profile of the finder pattern and a position of a center point of the circular profile of the target image as positions of vertexes for correcting the circular two-dimensional code.

8. The method according to claim 1, wherein the encoding region comprises a format region, code elements in the format region are distributed around the image region, and the code elements in the format region are used for recording format information of the circular two-dimensional code, and the format information comprises at least one of the following: version information, an error correction level, and mask information, and
    the recognizing the circular two-dimensional code according to the value of the code element in the encoding region comprises:
    obtaining the format information of the circular two-dimensional code according to the value of the code element in the format region; and
    recognizing the circular two-dimensional code according to the format information of the circular two-dimensional code.

9. The method according to claim 1, wherein the circular two-dimensional code comprises an edge region, and code elements in the edge region form a circular visual pattern.

10. An apparatus for recognizing a circular two-dimensional code, comprising: a processor and a memory, the memory storing a computer readable instruction, and the computer readable instruction being executed by the processor to complete the following operations:
selecting, from pixels of the circular two-dimensional code, a pixel comprised in a code element in an encoding region, the circular two-dimensional code comprising an image region and the encoding region, and the image region and the encoding region having no overlap;
determining a value of the code element in the encoding region according to the pixel comprised in the code element in the encoding region; and
recognizing the circular two-dimensional code according to the value of the code element in the encoding region.

11. The apparatus according to claim 10, wherein a remaining region of the circular two-dimensional code other than the image region comprises at least two strip-shaped regions formed by aggregating code elements of the circular two-dimensional code, the image region being located in the middle of the at least two strip-shaped regions, and the at least two strip-shaped regions being radially distributed around the image region.

12. The apparatus according to claim 10,
wherein a target image for recognizing a service type corresponding to the circular two-dimensional code is further disposed in the remaining region of the circular two-dimensional code other than the image region; and
wherein the computer readable instruction is executed by the processor to further complete the following operations:
searching, in the remaining region of the circular two-dimensional code other than the image region, for a finder pattern of the circular two-dimensional code and the target image;
determining, according to positions of the finder pattern and the target image, a position of a vertex for correcting the circular two-dimensional code; and
correcting the circular two-dimensional code according to the position of the vertex for correcting the circular two-dimensional code.

13. The apparatus according to claim 12, wherein the finder pattern and the target image have circular profiles, and the correction circuitry is configured to determine a position of a center point of the circular profile of the finder pattern and a position of a center point of the circular profile of the target image as positions of vertexes for correcting the circular two-dimensional code.

14. The apparatus according to claim 10, wherein the encoding region comprises a format region, code elements in the format region are distributed around the image region, and the code elements in the format region are used for recording format information of the circular two-dimensional code, and the format information comprises at least one of the following: version information, an error correction level, and mask information, and the recognition circuitry is configured to: obtain the format information of the circular two-dimensional code according to the value of the code element in the format region; and recognize the circular two-dimensional code according to the format information of the circular two-dimensional code.

15. A terminal, comprising:
a processing device, configured to: select, from pixels of a circular two-dimensional code, a pixel comprised in a code element in an encoding region, the circular two-dimensional code comprising an image region and the encoding region, and the image region and the encoding region having no overlap; determine a value of the code element in the encoding region according to the pixel comprised in the code element in the encoding region; and recognize the circular two-dimensional code according to the value of the code element in the encoding region; and
a display device, configured to display an identification result of the circular two-dimensional code.

16. The terminal according to claim 15, wherein a remaining region of the circular two-dimensional code other than the image region comprises at least two strip-shaped regions formed by aggregating code elements of the circular two-dimensional code, the image region being located in the middle of the at least two strip-shaped regions, and the at least two strip-shaped regions being radially distributed around the image region.

17. The terminal according to claim 15, wherein the at least two strip-shaped regions comprise a strip-shaped region with a first length and a strip-shaped region with a second length that are distributed in a staggered scheme, the first length being greater than the second length.

18. The terminal according to claim 15, wherein a target image for recognizing a service type corresponding to the circular two-dimensional code is further disposed in the remaining region of the circular two-dimensional code other than the image region.

19. The terminal according to claim 15, wherein the image region includes a circular region or a rectangular region.

20. The terminal according to claim 15, wherein an image set in the image region includes a profile picture or a logo of a user of the circular two-dimensional code.

* * * * *